(12) United States Patent
Nozaki et al.

(10) Patent No.: US 11,981,765 B2
(45) Date of Patent: May 14, 2024

(54) CATALYST FOR OLEFIN POLYMERIZATION AND METHOD FOR PRODUCING POLAR GROUP—CONTAINING OLEFIN POLYMER

(71) Applicants: THE UNIVERSITY OF TOKYO, Tokyo (JP); SHOWA DENKO K.K., Tokyo (JP); JAPAN POLYETHYLENE CORPORATION, Tokyo (JP)

(72) Inventors: Kyoko Nozaki, Tokyo (JP); Junichi Kuroda, Oita (JP); Shinya Hayashi, Oita (JP); Yoshikuni Okumura, Oita (JP); Masahiro Uematsu, Kawasaki (JP); Yusuke Mitsushige, Yokkaichi (JP)

(73) Assignees: THE UNIVERSITY OF TOKYO, Tokyo (JP); Resonac Corporation, Tokyo (JP); JAPAN POLYETHYLENE CORPORATION, Tokyo (JP)

( * ) Notice: Subject to any disclaimer, the term of this patent is extended or adjusted under 35 U.S.C. 154(b) by 532 days.

(21) Appl. No.: 17/425,201

(22) PCT Filed: Feb. 25, 2020

(86) PCT No.: PCT/JP2020/007507
§ 371 (c)(1),
(2) Date: Jul. 22, 2021

(87) PCT Pub. No.: WO2020/175482
PCT Pub. Date: Sep. 3, 2020

(65) Prior Publication Data
US 2022/0089791 A1    Mar. 24, 2022

(30) Foreign Application Priority Data
Feb. 25, 2019  (JP) .................................. 2019-031423

(51) Int. Cl.
*C08F 4/80* (2006.01)
*C08F 4/70* (2006.01)
*C08F 10/02* (2006.01)
*C08F 110/02* (2006.01)
*C08F 210/02* (2006.01)
*C08F 218/02* (2006.01)

(52) U.S. Cl.
CPC .............. *C08F 4/80* (2013.01); *C08F 4/7031* (2013.01); *C08F 110/02* (2013.01); *C08F 210/02* (2013.01); *C08F 218/02* (2013.01)

(58) Field of Classification Search
CPC ...... C08F 4/7031; C08F 10/02; C08F 210/02; C08F 218/02
See application file for complete search history.

(56) References Cited

U.S. PATENT DOCUMENTS

| | | | |
|---|---|---|---|
| 8,916,663 B2 | 12/2014 | Nozaki et al. | |
| 9,303,101 B2 | 4/2016 | Nozaki et al. | |
| 9,376,459 B2 * | 6/2016 | Kobayashi | C07F 9/65515 |
| 9,499,644 B2 * | 11/2016 | Ito | C08F 4/80 |
| 10,414,837 B2 * | 9/2019 | Nozaki | C08F 4/80 |
| 10,975,182 B2 * | 4/2021 | Abe | C08F 220/06 |
| 11,084,957 B2 * | 8/2021 | Uematsu | C09J 7/20 |
| 11,248,074 B2 * | 2/2022 | Ito | C08F 210/02 |
| 11,352,453 B2 * | 6/2022 | Nozaki | C07F 15/006 |
| 11,697,698 B2 * | 7/2023 | Nozaki | C08F 4/52 526/171 |
| 2017/0313792 A1 | 11/2017 | Nozaki et al. | |

FOREIGN PATENT DOCUMENTS

| | | | | |
|---|---|---|---|---|
| JP | 2011-68881 A | 4/2011 | | |
| JP | 2012-201673 A | 10/2012 | | |
| JP | 2012-229190 A | 11/2012 | | |
| JP | 2012-236824 A | 12/2012 | | |
| JP | 2014-159540 A | 9/2014 | | |
| JP | 2015-137282 A | 7/2015 | | |
| JP | 2015137282 A | * | 7/2015 | ............... C08F 4/80 |
| JP | 2016-84437 A | 5/2016 | | |
| JP | 2016084437 A | * | 5/2016 | ............... C08F 4/80 |
| WO | 2013/168626 A1 | 11/2013 | | |
| WO | 2016/067776 A1 | 5/2016 | | |

OTHER PUBLICATIONS

Shingo Ito, et al. "Coordination—Insertion Copolymerization of Allyl Monomers with Ethylene", Journal of the American Chemical Society, J. Am. Chem. Soc., 2011, 133, pp. 1232-1235.
Takuya Kochi, et al., "Formation of Linear Copolymers of Ethylene and Acrylonitrile Catalyzed by Phosphine Sulfonate Palladium Complexes", J. Am. Chem. Soc., 2007, 129, pp. 8948-8949.
R. C. Laible, "Allyl Polymerizations", Chem. Rev., 1958, pp. 807-843.
International Search Report for PCT/JP2020/007507 dated May 12, 2020.

* cited by examiner

*Primary Examiner* — Rip A Lee
(74) *Attorney, Agent, or Firm* — Sughrue Mion, PLLC

(57) ABSTRACT

The present invention provides: a catalyst which has high activity and enables the production of an olefin polymer that has a polar group; and a method for producing the polymer. A catalyst for olefin polymerization, which contains a metal complex represented by general formula (C1); and a method for producing an ethylene (co)polymer, wherein (1) ethylene is polymerized, (2) ethylene and an olefin having a polar group represented by general formula (1) are copolymerized, or (3) ethylene, an olefin having a polar group represented by general formula (1) and another monomer are copolymerized, with use of the above-described catalyst. (In the formulae, the symbols are as defined in the description; and at least one of $R^6$ and $R^7$ represents a 9-fluorenyl analogous group represented by general formula (2).

8 Claims, No Drawings

CATALYST FOR OLEFIN POLYMERIZATION AND METHOD FOR PRODUCING POLAR GROUP—CONTAINING OLEFIN POLYMER

CROSS REFERENCE TO RELATED APPLICATIONS

This application is a National Stage of International Application No. PCT/JP2020/007507 filed Feb. 25, 2020, claiming priority based on Japanese Patent Application No. 2019-031423 filed Feb. 25, 2019.

FIELD

The present invention relates to a catalyst for olefin polymerization and a method for producing an olefin polymer, in particular, a polymer of a polar group-containing monomer, such as an allyl compound having a polar group.

BACKGROUND

Copolymers of olefins, such as ethylene and propylene, which are nonpolar monomers, and vinyl monomers having a polar group, have functionality and characteristics which are not found in nonpolar polyethylene and polypropylene, and are used in a wide range of fields. In particular, an ethylene-vinyl alcohol copolymer (EVOH) is a copolymer composed of an ethylene monomer structural unit and a vinyl alcohol monomer structural unit, and is produced by saponifying an ethylene-vinyl acetate copolymer obtained by radical copolymerization of ethylene and vinyl acetate. EVOH is used in a wide range of fields, such as food packaging applications, by utilizing its excellent gas-barrier properties.

On the other hand, polymerization of a monomer having an allyl group is more difficult than that of an ordinary vinyl monomer, and polymers thereof are hardly known. The main reason for this is that when the monomer having an allyl group is radically polymerized, the growth reaction of the polymer is extremely slow because of the degradative chain transfer reaction to the monomer by abstraction of a hydrogen atom present on the allylic carbon, and only oligomers with a low degree of polymerization are obtained (Chem. Rev. 58, 808 (1958); NPL 1).

JP 2011-68881 A (U.S. Pat. No. 8,916,663; PTL 1), WO 2013/168626 (U.S. Pat. No. 9,303,101; PTL 2), JP 2014-159540 A (PTL 3), JP 2015-137282 A (PTL 4), and J. Am. Chem. Soc., 133, 1232 (2011) (NPL 2) describe coordination copolymerization of ethylene and a polar group-containing allyl monomer using a metal complex catalyst of Group 10 of the Periodic Table, and have succeeded in the synthesis of a copolymer of a polar group-containing allyl monomer, which has not been obtained by a radical polymerization method. However, from the viewpoint of catalyst cost, catalytic activity and polymer productivity per unit catalyst are not sufficient, and there remains a problem for industrialization.

CITATION LIST

Patent Literature

[PTL 1] JP 2011-68881 A (U.S. Pat. No. 8,916,663)
[PTL 2] WO 2013/168626 (U.S. Pat. No. 9,303,101)
[PTL 3] JP 2014-159540 A
[PTL 4] JP 2015-137282 A

Non-Patent Literature

[NPL 1] Chem. Rev. 58, 808 (1958)
[NPL 2] J. Am. Chem. Soc., 133, 1232 (2011)

SUMMARY

Technical Problem

It is an object of the present invention to provide a catalyst and a method for producing an olefin polymer having a polar group, which can be used for various applications with high catalytic activity.

Solution to Problem

As a result of intensive studies to solve the aforementioned problems, the present inventors have found that an olefin polymer having a polar group, which can be used for various applications, can be produced with high catalytic activity by copolymerizing a vinyl monomer, such as ethylene or propylene (nonpolar olefins), alone, or the nonpolar olefin and a polar group-containing olefin (including an allyl monomer having a polar group), using a novel metal complex of Group 10 of the Periodic Table as a catalyst, thereby completing the present invention.

That is, the present invention relates to a catalyst for olefin polymerization of the following [1] to [3], and a method for producing a (co)polymer of ethylene of the following [4] to [8].

[1] A catalyst for olefin polymerization comprising a metal complex represented by formula (C1)

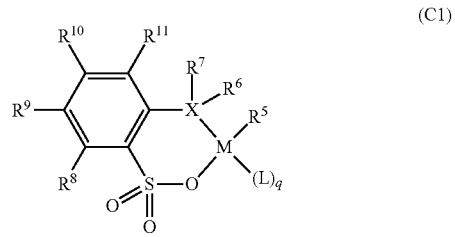

wherein, in the formula, M represents an element of Group 10 of the Periodic Table; X represents a phosphorus atom (P) or an arsenic atom (As); $R^5$ represents a substituent selected from the group consisting of a hydrogen atom, a halogen atom, a hydrocarbon group having 1 to 30 carbon atoms, a hydrocarbon group having 1 to 30 carbon atoms substituted with a halogen atom, a hydrocarbon group having 2 to 30 carbon atoms substituted with an alkoxy group having 1 to 10 carbon atoms, a hydrocarbon group having 7 to 30 carbon atoms substituted with an aryloxy group having 6 to 20 carbon atoms, a hydrocarbon group having 3 to 30 carbon atoms substituted with an amido group having 2 to 10 carbon atoms, an alkoxy group having 1 to 30 carbon atoms, an aryloxy group having 6 to 30 carbon atoms, and an acyloxy group having 2 to 10 carbon atoms; $R^6$ and $R^7$ each independently represent an alkoxy group, an aryloxy group, a silyl group, an amino group, or a hydrocarbon group having 1 to 180 carbon atoms which may be substituted with one or more groups selected from a halogen atom, an alkoxy group, and an aryloxy group, and at least one of $R^6$ and $R^7$ represents a 9-fluorenyl analogous group represented by formula (2)

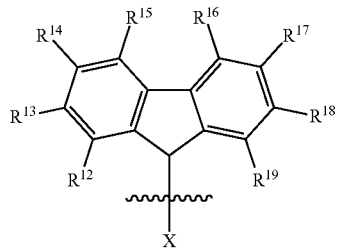

wherein, in the formula, $R^{12}$, $R^{13}$, $R^{14}$, $R^{15}$, $R^{16}$, $R^{17}$, $R^{18}$ and $R^{19}$ each independently represent a substituent selected from the group consisting of a hydrogen atom, a halogen atom, a hydrocarbon group having 1 to 10 carbon atoms, a hydrocarbon group having 1 to 10 carbon atoms substituted with a halogen atom, a hydrocarbon group having 2 to 20 carbon atoms substituted with an alkoxy group having 1 to 10 carbon atoms, a hydrocarbon group having 7 to 20 carbon atoms substituted with an aryloxy group having 6 to 10 carbon atoms, an alkoxy group having 1 to 10 carbon atoms, an aryloxy group having 6 to 10 carbon atoms, and an acyloxy group having 2 to 10 carbon atoms; and $R^{12}$, $R^{13}$, $R^{14}$, $R^{15}$, $R^{16}$, $R^{17}$, $R^{18}$ and $R^{19}$ may be bonded to each other to form a ring structure; wherein, in formula (2), a bond between a carbon atom and X in formula (C1) is depicted; $R^8$, $R^9$, $R^{10}$ and $R^{11}$ each independently represent a hydrogen atom, a halogen atom, a hydrocarbon group having 1 to 20 carbon atoms, an alkoxy group having 1 to 8 carbon atoms, an aryloxy group having 6 to 20 carbon atoms, a silyl group substituted with a hydrogen atom or a hydrocarbon group having 1 to 20 carbon atoms, or a hydrocarbon group having 1 to 20 carbon atoms substituted with a halogen atom; L represents an electron-donating ligand; and q is 0, ½, 1 or 2.

[2] The catalyst for olefin polymerization according to the above item 1, wherein the 9-fluorenyl analogous group represented by formula (2) is a 9-fluorenyl group or a 2,7-di-t-butyl-9-fluorenyl group.

[3] The catalyst for olefin polymerization according to the above item 1 or 2, wherein all of $R^8$, $R^9$, $R^{10}$ and $R^{11}$ in formula (C1) are a hydrogen atom.

[4] A method for producing polyethylene; or a copolymer of ethylene and an olefin having a polar group represented by formula (1)

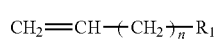

wherein, in the formula, $R^1$ represents a substituent selected from the group consisting of a hydroxy group, an alkoxy group having 1 to 10 carbon atoms, an aryloxy group having 6 to 20 carbon atoms, an acyl group having 2 to 10 carbon atoms, an ester group (oxycarbonyl group; R—O—(C=O)—, R is an organic group) having 2 to 10 carbon atoms, an acyloxy group having 2 to 10 carbon atoms, an amino group, a substituted amino group having 1 to 12 carbon atoms, a substituted amido group having 2 to 12 carbon atoms, a substituted pyridyl group having 5 to 10 carbon atoms, a substituted pyrrolidyl group having 4 to 10 carbon atoms, a substituted piperidyl group having 5 to 10 carbon atoms, a substituted hydrofuryl group having 4 to 10 carbon atoms, a substituted imidazolyl group having 4 to 10 carbon atoms, a mercapto group, an alkylthio group having 1 to 10 carbon atoms, an arylthio group having 6 to 10 carbon atoms, an epoxy group, and a halogen atom; and n is 0, or an integer selected from 1 to 6; or a copolymer of ethylene, the olefin having a polar group represented by formula (1) and an additional monomer, the method comprising, by using a metal catalyst represented by formula (C1)

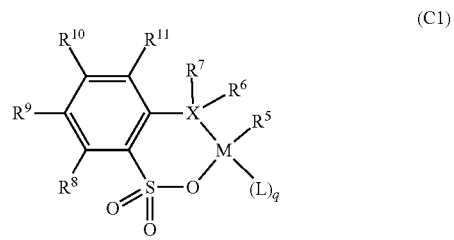

wherein symbols in the formula have the same meanings as described in the above item 1, as a polymerization catalyst, polymerizing ethylene alone; or copolymerizing ethylene and the olefin having a polar group represented by formula (1); or copolymerizing ethylene, the olefin having a polar group represented by formula (1) and the additional monomer.

[5] The method for producing a polymer according to the above item 4, wherein n in formula (1) is 0.

[6] The method for producing a polymer according to the above item 4, wherein n in formula (1) is 1.

[7] The method for producing a polymer according to any one of the above items 4 to 6, wherein the 9-fluorenyl analogous group represented by formula (2) is a 9-fluorenyl group or a 2,7-di-t-butyl-9-fluorenyl group.

[8] The method for producing a polymer according to any one of the above items 4 to 7, wherein all of $R^8$, $R^9$, $R^{10}$ and $R^{11}$ in formula (C1) area hydrogen atom.

Advantageous Effects of Invention

According to the present invention, by copolymerizing an apolar olefin (ethylene) and an olefin having a polar group, such as an allyl monomer having a polar group, using a novel metal complex of Group 10 of the Periodic Table having high catalytic activity as a catalyst, an olefin polymer having a polar group, which can be used for various applications, can be produced at low cost.

DESCRIPTION OF EMBODIMENTS

[Catalyst]

A catalyst comprising a metal complex of Group 10 of the Periodic Table used in the present invention is represented by formula (C1)

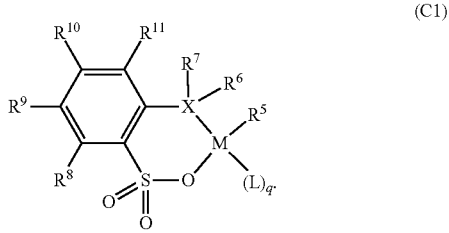

In the formula, M represents an element of Group 10 of the Periodic Table, and X represents a phosphorus atom (P) or an arsenic atom (As). $R^5$ represents a substituent selected from the group consisting of a hydrogen atom, a halogen atom, a hydrocarbon group having 1 to 30 carbon atoms, a hydrocarbon group having 1 to 30 carbon atoms substituted with a halogen atom, a hydrocarbon group having 2 to 30 carbon atoms substituted with an alkoxy group having 1 to 10 carbon atoms, a hydrocarbon group having 7 to 30 carbon atoms substituted with an aryloxy group having 6 to 20 carbon atoms, a hydrocarbon group having 3 to 30 carbon atoms substituted with an amido group having 2 to 10 carbon atoms, an alkoxy group having 1 to 30 carbon atoms, an aryloxy group having 6 to 30 carbon atoms, and an acyloxy group having 2 to 10 carbon atoms. $R^6$ and $R^7$ each independently represent an alkoxy group, an aryloxy group, a silyl group, an amino group, or a hydrocarbon group having 1 to 180 carbon atoms which may be substituted with one or more groups selected from a halogen atom, an alkoxy group, and an aryloxy group, and at least one of $R^6$ and $R^7$ represents a 9-fluorenyl analogous group represented by formula (2)

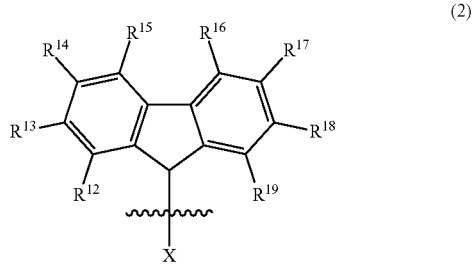

wherein, in the formula, $R^{12}$, $R^{13}$, $R^{14}$, $R^{15}$, $R^{16}$, $R^{17}$, $R^{18}$ and $R^{19}$ each independently represent a substituent selected from the group consisting of a hydrogen atom, a halogen atom, a hydrocarbon group having 1 to 10 carbon atoms, a hydrocarbon group having 1 to 10 carbon atoms substituted with a halogen atom, a hydrocarbon group having 2 to 20 carbon atoms substituted with an alkoxy group having 1 to 10 carbon atoms, a hydrocarbon group having 7 to 20 carbon atoms substituted with an aryloxy group having 6 to 10 carbon atoms, an alkoxy group having 1 to 10 carbon atoms, an aryloxy group having 6 to 10 carbon atoms, and an acyloxy group having 2 to 10 carbon atoms; and $R^{12}$, $R^{13}$, $R^{14}$, $R^{15}$, $R^{16}$, $R^{17}$, $R^{18}$ and $R^{19}$ may be bonded to each other to form a ring structure. In the formula, a bond between a carbon atom and X in formula (C1) is depicted. $R^8$, $R^9$, $R^{10}$ and $R^{11}$ each independently represent a hydrogen atom, a halogen atom, a hydrocarbon group having 1 to 20 carbon atoms, an alkoxy group having 1 to 8 carbon atoms, an aryloxy group having 6 to 20 carbon atoms, a silyl group substituted with a hydrogen atom or a hydrocarbon group having 1 to 20 carbon atoms, or a hydrocarbon group having 1 to 20 carbon atoms substituted with a halogen atom. L represents an electron-donating ligand, and q is 0, ½, 1 or 2.

As used herein, "hydrocarbon" includes saturated and unsaturated aliphatic hydrocarbons and aromatic hydrocarbons.

Hereinafter, the structure of formula (C1) will be described.

M represents an element of Group 10 of the Periodic Table. Examples of the element of Group 10 of the Periodic Table include Ni, Pd, and Pt, and Ni and Pd are preferable from the viewpoint of catalytic activity and the molecular weight of an obtained polymer, and Pd is more preferable.

X is a phosphorus atom (P) or an arsenic atom (As), and is two-electron coordinated to the metal center M. X is preferably a phosphorus atom (P) from the viewpoint of availability and catalyst cost.

$R^5$ represents a substituent selected from the group consisting of a hydrogen atom, a halogen atom, a hydrocarbon group having 1 to 30 carbon atoms, a hydrocarbon group having 1 to 30 carbon atoms substituted with a halogen atom, a hydrocarbon group having 2 to 30 carbon atoms substituted with an alkoxy group having 1 to 10 carbon atoms, a hydrocarbon group having 7 to 30 carbon atoms substituted with an aryloxy group having 6 to 20 carbon atoms, a hydrocarbon group having 3 to 30 carbon atoms substituted with an amido group having 2 to 10 carbon atoms, an alkoxy group having 1 to 30 carbon atoms, an aryloxy group having 6 to 30 carbon atoms, and an acyloxy group having 2 to 10 carbon atoms.

Preferred examples of the halogen atom represented by $R^5$ include fluorine, chlorine and bromine. Among these, chlorine is preferable.

The hydrocarbon group having 1 to 30 carbon atoms represented by $R^5$ is preferably a hydrocarbon group having 1 to 13 carbon atoms, and is an alkyl group, a cycloalkyl group, an aryl group, or an aralkyl group.

Preferred examples thereof include a methyl group, an ethyl group, a 1-propyl group, a 1-butyl group, a 1-pentyl group, a 1-hexyl group, a 1-heptyl group, a 1-octyl group, a 1-nonyl group, a 1-decyl group, a t-butyl group, a tricyclohexylmethyl group, a 1,1-dimethyl-2-phenylethyl group, an isopropyl group, a 1,1-dimethylpropyl group, a 1,1,2-trimethylpropyl group, a 1,1-diethylpropyl group, a 1-phenyl-2-propyl group, an isobutyl group, a 1,1-dimethylbutyl group, a 2-pentyl group, a 3-pentyl group, a 2-hexyl group, a 3-hexyl group, a 2-ethylhexyl group, a 2-heptyl group, a 3-heptyl group, a 4-heptyl group, a 2-propylheptyl group, a 2-octyl group, a 3-nonyl group, a cyclopropyl group, a cyclobutyl group, a cyclopentyl group, a methylcyclopentyl group, a cyclohexyl group, a methylcyclohexyl group, a cycloheptyl group, a cyclooctyl group, a cyclododecyl group, a 1-adamantyl group, a 2-adamantyl group, an exo-norbonyl group, an end-norbonyl group, a 2-bicyclo[2.2.2]octyl group, a nopinyl group, a decahydronaphthyl group, a menthyl group, a neomenthyl group, a neopentyl group, a 5-decyl group, a phenyl group, a naphthyl group, an anthracenyl group, a fluorenyl group, a tolyl group, a xylyl group, a benzyl group, and a p-ethylphenyl group.

Among these, a more preferable group is a methyl group or a benzyl group, and particularly preferably is a methyl group.

The hydrocarbon group having 1 to 30 carbon atoms substituted with a halogen atom represented by $R^5$ is preferably a group in which the aforementioned hydrocarbon group having 1 to 30 carbon atoms is substituted with fluorine, chlorine or bromine, and preferred examples thereof include a trifluoromethyl group and a pentafluorophenyl group.

The hydrocarbon group having 2 to 30 carbon atoms substituted with an alkoxy group having 1 to 10 carbon atoms represented by $R^5$ is preferably a group in which the aforementioned hydrocarbon group having 1 to 30 carbon atoms is substituted with a methoxy group, an ethoxy group, an isopropoxy group, a 1-propoxy group, a 1-butoxy group, or a t-butoxy group. More preferred are hydrocarbon groups having 2 to 6 carbon atoms substituted with a methoxy group or an ethoxy group. Specifically, they include a 1-(methoxymethyl)ethyl group, a 1-(ethoxymethyl)ethyl group, a 1-(methoxyethyl)ethyl group, a 1-(ethoxyethyl) ethyl group, a di(methoxymethyl)methyl group, and a di(ethoxymethyl)methyl group. Particularly preferred are a 1-(methoxymethyl)ethyl group, and a 1-(ethoxymethyl) ethyl group.

The hydrocarbon group having 7 to 30 carbon atoms substituted with an aryloxy group having 6 to 20 carbon atoms represented by $R^5$ is preferably a group in which the aforementioned hydrocarbon group having 1 to 30 carbon atoms is substituted with a phenoxy group, a 4-methylphenoxy group, a 4-methoxyphenoxy group, a 2,6-dimethylphenoxy group, or a 2,6-di-t-butylphenoxy group. More preferred are hydrocarbon groups having 1 to 6 carbon atoms substituted with a phenoxy group or a 2,6-dimethylphenoxy group, and particularly preferred are a 1-(phenoxymethyl) ethyl group, a di(phenoxymethyl)methyl group, and a 1-(2, 6-dimethylphenoxy)ethyl group.

The hydrocarbon group having 3 to 30 carbon atoms substituted with an amido group (R—(C=O)NH—, R is an organic group) having 2 to 10 carbon atoms represented by $R^5$ is preferably a substituent in which the aforementioned hydrocarbon group having 1 to 30 carbon atoms is substituted with an acetamido group, a propionylamino group, a butyrylamino group, an isobutyrylamino group, a valerylamino group, an isovalerylamino group, a pivaloylamino group, or a benzoylamino group. More preferred are a 2-acetamidophenyl group, a 2-propionylaminophenyl group, a 2-valerylaminophenyl group, and a 2-benzoylphenyl group, and particularly preferred is a 2-acetamidophenyl group The alkoxy group having 1 to 30 carbon atoms represented by $R^5$ is preferably an alkoxy group having 1 to 6 carbon atoms, and preferred examples thereof include a methoxy group, an ethoxy group, an isopropoxy group, a 1-propoxy group, a 1-butoxy group, and a t-butoxy group.

Among these, a more preferable group is a methoxy group, an ethoxy group, or an isopropoxy group, and particularly preferred is a methoxy group.

The aryloxy group having 6 to 30 carbon atoms represented by $R^5$ is preferably an aryloxy group having 6 to 12 carbon atoms, and preferred examples thereof include a phenoxy group, a 4-methylphenoxy group, a 4-methoxyphenoxy group, a 2,6-dimethylphenoxy group, and a 2,6-di-t-butylphenoxy group. Among these, a more preferable group is a phenoxy group or a 2,6-dimethylphenoxy group, and particularly preferred is a phenoxy group.

The acyloxy group having 2 to 10 carbon atoms represented by $R^5$ is preferably an acyloxy group having 2 to 8 carbon atoms, and preferred examples thereof include an acetyloxy group, a propionyloxy group, a butyryloxy group, an isobutyryloxy group, a valeryloxy group, an isovaleryloxy group, a pivaloyloxy group, and a benzoyloxy group.

Among these, a more preferable group is an acetyloxy group, a propionyloxy group, or a benzoyloxy group, and particularly preferred are an acetyloxy group and a propionyloxy group.

Among the preferred groups as $R^5$, more preferred are hydrocarbon groups having 1 to 30 carbon atoms, alkoxy groups having 1 to 30 carbon atoms, hydrocarbon groups having 3 to 30 carbon atoms substituted with an amido group having 2 to 10 carbon atoms, and acyloxy groups having 2 to 10 carbon atoms, and particularly preferred examples thereof include a methyl group, a benzyl group, a methoxy group, a 2-acetamidophenyl group, and an acetyloxy group.

$R^6$ and $R^7$ each independently represent an alkoxy group, an aryloxy group, a silyl group, an amino group, or a hydrocarbon group having 1 to 180 carbon atoms which may be substituted with one or more groups selected from a halogen atom, an alkoxy group, and an aryloxy group, and at least one of $R^6$ and $R^7$ represents a 9-fluorenyl analogous group represented by formula (2)

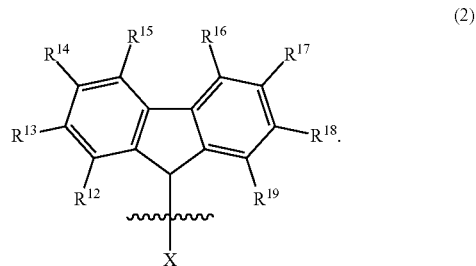

(2)

In formula (2), $R^{12}$, $R^{13}$, $R^{14}$, $R^{15}$, $R^{16}$, $R^{17}$, $R^{18}$ and $R^{19}$ each independently represent a substituent selected from the group consisting of a hydrogen atom, a halogen atom, a hydrocarbon group having 1 to 10 carbon atoms, a hydrocarbon group having 1 to 10 carbon atoms substituted with a halogen atom, a hydrocarbon group having 2 to 20 carbon atoms substituted with an alkoxy group having 1 to 10 carbon atoms, a hydrocarbon group having 7 to 20 carbon atoms substituted with an aryloxy group having 6 to 10 carbon atoms, an alkoxy group having 1 to 10 carbon atoms, an aryloxy group having 6 to 10 carbon atoms, and an acyloxy group having 2 to 10 carbon atoms; and $R^{12}$, $R^{13}$, $R^{14}$, $R^{15}$, $R^{16}$, $R^{17}$, $R^{18}$ and $R^{19}$ may be bonded to each other to form a ring structure. In formula (2), a bond between a carbon atom and X in formula (C1) is depicted.

The alkoxy group represented by $R^6$ or $R^7$ preferably has 1 to 20 carbon atoms, and examples thereof include a methoxy group, an ethoxy group, a propoxy group, and an isopropoxy group.

The aryloxy group represented by $R^6$ or $R^7$ preferably has 6 to 24 carbon atoms, and examples thereof include a phenoxy group.

Examples of the silyl group represented by $R^6$ or $R^7$ include a trimethylsilyl group, and examples of the amino group include an amino group, a methylamino group, and a dimethylamino group.

The halogen atom in the hydrocarbon group having 1 to 180 carbon atoms which may be substituted with one or more groups selected from a halogen atom, an alkoxy group, and an aryloxy group represented by $R^6$ or $R^7$ is a fluorine atom, a chlorine atom, or a bromine atom, and preferred is a fluorine atom. The alkoxy group preferably has 1 to 20 carbon atoms, and examples thereof include a methoxy group, an ethoxy group, a propoxy group, and an isopropoxy group. The aryloxy group preferably has 6 to 24 carbon atoms, and examples thereof include a phenoxy group. The number of carbon atoms of the hydrocarbon group having 1 to 180 carbon atoms includes the number of carbon atoms of the aforementioned substituents. The hydrocarbon groups are not particularly limited, but at least one thereof is a group represented by formula (2) as stated below.

Specific examples of the hydrocarbon group having 1 to 180 carbon atoms which may be substituted with one or more groups selected from a halogen atom, an alkoxy group, and an aryloxy group, other than the group represented by formula (2), include a methyl group, an ethyl group, an n-propyl group, an isopropyl group, an n-butyl group, an isobutyl group, a sec-butyl group, a t-butyl group, an n-pentyl group, a 2-pentyl group, a 3-pentyl group, a neopentyl group, an n-hexyl group, a 2-hexyl group, a 3-hexyl group, a 2-heptyl group, a 3-heptyl group, a 4-heptyl group, a 2-methyl-4-heptyl group, a 2,6-dimethyl-4-heptyl group, a 3-methyl-4-heptyl group, a cyclopropyl group, a cyclobutyl group, a cyclopentyl group, a cyclohexyl group, a cycloheptyl group, a cyclooctyl group, a 1-adamantyl group, a trifluoromethyl group, a benzyl group, a 2'-methoxybenzyl group, a 3'-methoxybenzyl group, a 4'-methoxybenzyl group, a 4'-trifluoromethylbenzyl group, a phenyl group, a 2-methylphenyl group, a 3-methylphenyl group, a 4-methylphenyl group, a 2,6-dimethylphenyl group, a 3,5-dimethylphenyl group, a 2,4,6-trimethylphenyl group, a 2-isopropylphenyl group, a 3-isopropylphenyl group, a 4-isopropylphenyl group, a 2,6-diisopropylphenyl group, a 3,5-diisopropylphenyl group, a 2,4,6-triisopropylphenyl group, a 2-t-butylphenyl group, a 2-cyclohexylphenyl group, a 2-methoxyphenyl group, a 3-methoxyphenyl group, a 4-methoxyphenyl group, a 2,6-dimethoxyphenyl group, a 3,5-dimethoxyphenyl group, a 2,4,6-trimethoxyphenyl group, a 4-fluorophenyl group, a pentafluorophenyl group, a 4-trifluoromethylphenyl group, a 3,5-bis(trifluoromethyl) phenyl group, a 1-naphthyl group, a 2-naphthyl group, a 2-furyl group, a 2-biphenyl group, a 2',6'-dimethoxy-2-biphenyl group, a 2'-methyl-2-biphenyl group, and a 2',4', 6'-triisopropyl-2-biphenyl group.

$R^6$ and $R^7$ may be the same or different from each other. $R^6$ and $R^7$ may be bonded to form a ring structure.

At least one of $R^6$ and $R^7$ is a 9-fluorenyl analogous group represented by formula (2)

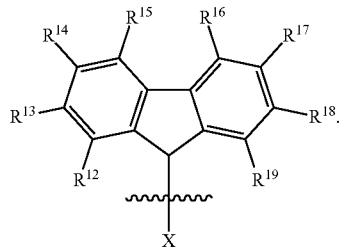

(2)

In the formula, $R^{12}$, $R^{13}$, $R^{14}$, $R^{15}$, $R^{16}$, $R^{17}$, $R^{18}$ and $R^{19}$ each independently represent a substituent selected from the group consisting of a hydrogen atom, a halogen atom, a hydrocarbon group having 1 to 10 carbon atoms, a hydrocarbon group having 1 to 10 carbon atoms substituted with a halogen atom, a hydrocarbon group having 2 to 20 carbon atoms substituted with an alkoxy group having 1 to 10 carbon atoms, a hydrocarbon group having 7 to 20 carbon atoms substituted with an aryloxy group having 6 to 10 carbon atoms, an alkoxy group having 1 to 10 carbon atoms, an aryloxy group having 6 to 10 carbon atoms, and an acyloxy group having 2 to 10 carbon atoms; and $R^{12}$, $R^{13}$, $R^{14}$, $R^{15}$, $R^{16}$, $R^{17}$, $R^{18}$ and $R^{19}$ may be bonded to each other to form a ring structure. In the formula, a bond between a carbon atom and X in formula (C1) is depicted.

Specific examples of the halogen atom represented by $R^{12}$, $R^{13}$, $R^{14}$, $R^{15}$, $R^{16}$, $R^{17}$, $R^{18}$ or $R^{19}$ include an iodine atom, a fluorine atom, a bromine atom, and a chlorine atom, and particularly preferred are a fluorine atom and a chlorine atom.

Preferred examples of the hydrocarbon group having 1 to 10 carbon atoms represented by $R^{12}$, $R^{13}$, $R^{14}$, $R^{15}$, $R^{16}$, $R^{17}$, $R^{18}$ or $R^{19}$ include a methyl group, an ethyl group, an n-propyl group, an isopropyl group, an n-butyl group, an isobutyl group, a sec-butyl group, a t-butyl group, a phenyl group, a 1-naphtyl group, a 2-naphtyl group, and a benzyl group, and particularly preferred are a methyl group, an isopropyl group, a t-butyl group, and a phenyl group.

Preferred examples of the hydrocarbon group having 1 to 10 carbon atoms substituted with a halogen atom represented by $R^{12}$, $R^{13}$, $R^{14}$, $R^{15}$, $R^{16}$, $R^{17}$, $R^{18}$ or $R^{19}$ include a hydrocarbon group having 1 to 10 carbon atoms which are exemplified above and substituted with one or more halogen atoms, and particularly preferred are a trifluoromethyl group, a trichloromethyl group, a pentafluoroethyl group, and a pentafluorophenyl group.

Preferred examples of the alkoxy group having 1 to 10 carbon atoms in the hydrocarbon group having 2 to 20 carbon atoms substituted with the alkoxy group having 1 to 10 carbon atoms represented by $R^{12}$, $R^{13}$, $R^{14}$, $R^{15}$, $R^{16}$, $R^{17}$, $R^{18}$ or $R^{19}$ include a methoxy group, an ethoxy group, a 1-propoxy group, an isopropoxy group, a 1-butoxy group, an isobutoxy group, a sec-butoxy group, a t-butoxy group, and a pentyloxy group. Preferred examples of the hydrocarbon group having 2 to 20 carbon atoms substituted with the alkoxy group having 1 to 10 carbon atoms include a hydrocarbon group having 1 to 10 carbon atoms which is exemplified above and substituted with the alkoxy group. Particularly preferred examples thereof include a methoxymethyl group, a 2-methoxyethyl group, an isopropoxymethyl group, a 2-isopropoxyethyl group, a 2-methoxyphenyl group, a 3-methoxyphenyl group, and a 4-methoxyphenyl group.

Preferred examples of the aryloxy group having 6 to 10 carbon atoms in the hydrocarbon group having 7 to 20 carbon atoms substituted with the aryloxy group having 6 to 10 carbon atoms represented by $R^{12}$, $R^{13}$, $R^{14}$, $R^{15}$, $R^{16}$, $R^{17}$, $R^{18}$ or $R^{19}$ include a phenoxy group, a 1-naphthoxy group, and a 2-naphthoxy group. Preferred examples of the hydrocarbon group having 7 to 20 carbon atoms substituted with the aryloxy group having 6 to 10 carbon atoms include a hydrocarbon group having 1 to 10 carbon atoms which is exemplified above and substituted with the aryloxy group. Particularly preferred examples thereof include a phenoxymethyl group, a 2-phenoxyethyl group, a 2-phenoxyphenyl group, a 3-phenoxyphenyl group, and a 4-phenoxyphenyl group.

Preferred examples of the alkoxy group having 1 to 10 carbon atoms represented by $R^{12}$, $R^{13}$, $R^{14}$, $R^{15}$, $R^{16}$, $R^{17}$, $R^{18}$ or $R^{19}$ include a methoxy group, an ethoxy group, a 1-propoxy group, an isopropoxy group, a 1-butoxy group, an isobutoxy group, a sec-butoxy group, a t-butoxy group, and a pentyloxy group, and particularly preferred are a methoxy group and an isopropoxy group.

Preferred examples of the aryloxy group having 6 to 10 carbon atoms represented by $R^{12}$, $R^{13}$, $R^{14}$, $R^{15}$, $R^{16}$, $R^{17}$, $R^{18}$ or $R^{19}$ include a phenoxy group, a 1-naphthoxy group, and a 2-naphthoxy group, and particularly preferred is a phenoxy group.

Preferred examples of the acyloxy group having 2 to 10 carbon atoms represented by $R^{12}$, $R^{13}$, $R^{14}$, $R^{15}$, $R^{16}$, $R^{17}$, $R^{18}$ or $R^{19}$ include an acetyloxy group, a propionyloxy group, a butyryloxy group, an isobutyryloxy group, a valeryloxy group, an isovaleryloxy group, a pivaloyloxy group, and a benzoyloxy group, and particularly preferred are an acetyloxy group, a propionyloxy group, and a benzoyloxy group.

It is preferable that $R^{12}$, $R^{13}$, $R^{14}$, $R^{15}$, $R^{16}$, $R^{17}$, $R^{18}$ and $R^{19}$ each independently be a hydrogen atom or a hydrocarbon group having 1 to 10 carbon atoms. The hydrocarbon group having 1 to 10 carbon atoms is more preferably an alkyl group having 1 to 5 carbon atoms, and most preferably a methyl group or a t-butyl group.

Specific examples of $R^6$ and $R^7$ in the case that $R^6$ or $R^7$ represents the 9-fluorenyl analogous group represented by formula (2) include a 9-fluorenyl group, a 1-methyl-9-fluorenyl group, a 2-methyl-9-fluorenyl group, a 3-methyl-9-fluorenyl group, a 4-methyl-9-fluorenyl group, a 1-ethyl-9-fluorenyl group, a 2-ethyl-9-fluorenyl group, a 3-ethyl-9-fluorenyl group, a 4-ethyl-9-fluorenyl group, a 1-n-propyl-9-fluorenyl group, a 2-n-propyl-9-fluorenyl group, a 3-n-propyl-9-fluorenyl group, a 4-n-propyl-9-fluorenyl group, a 1-isopropyl-9-fluorenyl group, a 2-isopropyl-9-fluorenyl group, a 3-isopropyl-9-fluorenyl group, a 4-isopropyl-9-fluorenyl group, a 1-n-butyl-9-fluorenyl group, a 2-n-butyl-9-fluorenyl group, a 3-n-butyl-9-fluorenyl group, a 4-n-butyl-9-fluorenyl group, a 1-isobutyl-9-fluorenyl group, a 2-isobutyl-9-fluorenyl group, a 3-isobutyl-9-fluorenyl group, a 4-isobutyl-9-fluorenyl group, a 1-sec-butyl-9-fluorenyl group, a 2-sec-butyl-9-fluorenyl group, a 3-sec-butyl-9-fluorenyl group, a 4-sec-butyl-9-fluorenyl group, a 1-t-butyl-9-fluorenyl group, a 2-t-butyl-9-fluorenyl group, a 3-t-butyl-9-fluorenyl group, a 4-t-butyl-9-fluorenyl group, a 1-methoxy-9-fluorenyl group, a 2-methoxy-9-fluorenyl group, a 3-methoxy-9-fluorenyl group, a 4-methoxy-9-fluorenyl group, a 1-ethoxy-9-fluorenyl group, a 2-ethoxy-9-fluorenyl group, a 3-ethoxy-9-fluorenyl group, a 4-ethoxy-9-fluorenyl group, a 1-phenoxy-9-fluorenyl group, a 2-phenoxy-9-fluorenyl group, a 3-phenoxy-9-fluorenyl group, a 4-phenoxy-9-fluorenyl group, a 1-trifluoromethyl-9-fluorenyl group, a 2-trifluoromethyl-9-fluorenyl group, a 3-trifluoromethyl-9-fluorenyl group, a 4-trifluoromethyl-9-fluorenyl group, a 1,2-dimethyl-9-fluorenyl group, a 1,3-dimethyl-9-fluorenyl group, a 1,4-dimethyl-9-fluorenyl group, a 1,5-dimethyl-9-fluorenyl group, a 1,6-dimethyl-9-fluorenyl group, a 1,7-dimethyl-9-fluorenyl group, a 1,8-dimethyl-9-fluorenyl group, a 2,3-dimethyl-9-fluorenyl group, a 2,4-dimethyl-9-fluorenyl group, a 2,5-dimethyl-9-fluorenyl group, a 2,6-dimethyl-9-fluorenyl group, a 2,7-dimethyl-9-fluorenyl group, a 3,4-dimethyl-9-fluorenyl group, a 3,5-dimethyl-9-fluorenyl group, a 3,6-dimethyl-9-fluorenyl group, a 4,5-dimethyl-9-fluorenyl group, a 1,2-diethyl-9-fluorenyl group, a 1,3-diethyl-9-fluorenyl group, a 1,4-diethyl-9-fluorenyl group, a 1,5-diethyl-9-fluorenyl group, a 1,6-diethyl-9-fluorenyl group, a 1,7-diethyl-9-fluorenyl group, a 1,8-diethyl-9-fluorenyl group, a 2,3-diethyl-9-fluorenyl group, a 2,4-diethyl-9-fluorenyl group, a 2,5-diethyl-9-fluorenyl group, a 2,6-diethyl-9-fluorenyl group, a 2,7-diethyl-9-fluorenyl group, a 3,4-diethyl-9-fluorenyl group, a 3,5-diethyl-9-fluorenyl group, a 3,6-diethyl-9-fluorenyl group, a 4,5-diethyl-9-fluorenyl group, a 1,2-di(n-propyl)-9-fluorenyl group, a 1,3-di(n-propyl)-9-fluorenyl group, a 1,4-di(n-propyl)-9-fluorenyl group, a 1,5-di(n-propyl)-9-fluorenyl group, a 1,6-di(n-propyl)-9-fluorenyl group, a 1,7-di(n-propyl)-9-fluorenyl group, a 1,8-di(n-propyl)-9-fluorenyl group, a 2,3-di(n-propyl)-9-fluorenyl group, a 2,4-di(n-propyl)-9-fluorenyl group, a 2,5-di(n-propyl)-9-fluorenyl group, a 2,6-di(n-propyl)-9-fluorenyl group, a 2,7-di(n-propyl)-9-fluorenyl group, a 3,4-di(n-propyl)-9-fluorenyl group, a 3,5-di(n-propyl)-9-fluorenyl group, a 3,6-di(n-propyl)-9-fluorenyl group, a 4,5-di(n-propyl)-9-fluorenyl group, a 1,2-diisopropyl-9-fluorenyl group, a 1,3-diisopropyl-9-fluorenyl group, a 1,4-diisopropyl-9-fluorenyl group, a 1,5-diisopropyl-9-fluorenyl group, a 1,6-diisopropyl-9-fluorenyl group, a 1,7-diisopropyl-9-fluorenyl group, a 1,8-diisopropyl-9-fluorenyl group, a 2,3-diisopropyl-9-fluorenyl group, a 2,4-diisopropyl-9-fluorenyl group, a 2,5-diisopropyl-9-fluorenyl group, a 2,6-diisopropyl-9-fluorenyl group, a 2,7-diisopropyl-9-fluorenyl group, a 3,4-diisopropyl-9-fluorenyl group, a 3,5-diisopropyl-9-fluorenyl group, a 3,6-diisopropyl-9-fluorenyl group, a 4,5-diisopropyl-9-fluorenyl group, a 1,2-di(t-butyl)-9-fluorenyl group, a 1,3-di(t-butyl)-9-fluorenyl group, a 1,4-di(t-butyl)-9-fluorenyl group, a 1,5-di(t-butyl)-9-fluorenyl group, a 1,6-di(t-butyl)-9-fluorenyl group, a 1,7-di(t-butyl)-9-fluorenyl group, a 1,8-di(t-butyl)-9-fluorenyl group, a 2,3-di(t-butyl)-9-fluorenyl group, a 2,4-di(t-butyl)-9-fluorenyl group, a 2,5-di(t-butyl)-9-fluorenyl group, a 2,6-di(t-butyl)-9-fluorenyl group, a 2,7-di(t-butyl)-9-fluorenyl group, a 3,4-di(t-butyl)-9-fluorenyl group, a 3,5-di(t-butyl)-9-fluorenyl group, a 3,6-di(t-butyl)-9-fluorenyl group, a 4,5-di(t-butyl)-9-fluorenyl group, a 1,2-dimethoxy-9-fluorenyl group, a 1,3-dimethoxy-9-fluorenyl group, a 1,4-dimethoxy-9-fluorenyl group, a 1,5-dimethoxy-9-fluorenyl group, a 1,6-dimethoxy-9-fluorenyl group, a 1,7-dimethoxy-9-fluorenyl group, a 1,8-dimethoxy-9-fluorenyl group, a 2,3-dimethoxy-9-fluorenyl group, a 2,4-dimethoxy-9-fluorenyl group, a 2,5-dimethoxy-9-fluorenyl group, a 2,6-dimethoxy-9-fluorenyl group, a 2,7-dimethoxy-9-fluorenyl group, a 3,4-dimethoxy-9-fluorenyl group, a 3,5-dimethoxy-9-fluorenyl group, a 3,6-dimethoxy-9-fluorenyl group, and a 4,5-dimethoxy-9-fluorenyl group.

Among these, preferred are a 9-fluorenyl group, a 2,7-dimethyl-9-fluorenyl group, a 2,7-diethyl-9-fluorenyl group, a 2,7-di(n-propyl)-9-fluorenyl group, a 2,7-diisopropyl-9-fluorenyl group, a 2,7-di(t-butyl)-9-fluorenyl group, a 3,6-dimethyl-9-fluorenyl group, a 3,6-diethyl-9-fluorenyl group, a 3,6-di(n-propyl)-9-fluorenyl group, a 3,6-diisopropyl-9-fluorenyl group, and a 3,6-di(t-butyl)-9-fluorenyl group, and particularly preferred are a 9-fluorenyl group, and a 2,7-di(t-butyl)-9-fluorenyl group.

Further, from the viewpoint of ease synthesis and catalytic activity, it is more preferable that $R^6$ and $R^7$ be each independently a 9-fluorenyl analogous group represented by formula (2), and most preferably the same 9-fluorenyl analogous group.

$R^8$, $R^9$, $R^{10}$ and $R^{11}$ each independently represent a hydrogen atom, a halogen atom, a hydrocarbon group having 1 to 20 carbon atoms, an alkoxy group having 1 to 8 carbon atoms, an aryloxy group having 6 to 20 carbon atoms, a silyl group substituted with a hydrogen atom or a hydrocarbon group having 1 to 20 carbon atoms, or a hydrocarbon group having 1 to 20 carbon atoms substituted with a halogen atom.

Preferred examples of the halogen atom represented by $R^8$, $R^9$, $R^{10}$ or $R^{11}$ include a fluorine atom, a chlorine atom, and a bromine atom. Among these, a fluorine atom is preferable.

The hydrocarbon group having 1 to 20 carbon atoms represented by $R^8$, $R^9$, $R^{10}$ or $R^{11}$ is preferably a hydrocarbon group having 1 to 13 carbon atoms, and is an alkyl group, a cycloalkyl group, an aryl group, or an aralkyl group.

Preferred examples thereof include a methyl group, an ethyl group, a 1-propyl group, a 1-butyl group, a 1-pentyl group, a 1-hexyl group, a 1-heptyl group, a 1-octyl group, a 1-nonyl group, a 1-decyl group, a t-butyl group, a tricyclohexylmethyl group, a 1,1-dimethyl-2-phenylethyl group, an isopropyl group, a 1,1-dimethylpropyl group, a 1,1,2-trimethylpropyl group, a 1,1-diethylpropyl group, a 1-phenyl-2-propyl group, an isobutyl group, a 1,1-dimethylbutyl group, a 2-pentyl group, a 3-pentyl group, a 2-hexyl group, a 3-hexyl group, a 2-ethylhexyl group, a 2-heptyl group, a 3-heptyl group, a 4-heptyl group, a 2-propylheptyl group, a 2-octyl group, a 3-nonyl group, a cyclopropyl group, a cyclobutyl group, a cyclopentyl group, a methylcyclopentyl group, a cyclohexyl group, a methylcyclohexyl group, a cycloheptyl group, a cyclooctyl group, a cyclododecyl group, a 1-adamantyl group, a 2-adamantyl group, an exo-norbonyl group, an end-norbonyl group, a 2-bicyclo[2.2.2]octyl group, a nopinyl group, a decahydronaphthyl group, a menthyl group, a neomenthyl group, a neopentyl group, a 5-decyl group, a phenyl group, a naphthyl group, an anthracenyl group, a fluorenyl group, a tolyl group, a xylyl group, a benzyl group, and a p-ethylphenyl group.

Among these, more preferred are a methyl group and a benzyl group, and particularly preferred is a methyl group.

Specific examples of the alkoxy group having 1 to 8 carbon atoms represented by $R^8$, $R^9$, $R^{10}$ or $R^{11}$ include a methoxy group, an ethoxy group, a 1-propoxy group, an isopropoxy group, a 1-butoxy group, an isobutoxy group, a sec-butoxy group, a t-butoxy group, and a pentyloxy group.

Among these, more preferred are a methoxy group, an ethoxy group, a 1-propoxy group, and an isopropoxy group, and particularly preferred are a methoxy group and an ethoxy group.

Specific examples of the aryloxy group having 6 to 20 carbon atoms represented by $R^8$, $R^9$, $R^{10}$ or $R^{11}$ include a phenoxy group, a 2-methylphenoxy group, a 3-methylphenoxy group, a 4-methylphenoxy group, a 2-methoxyphenoxy group, a 3-methoxyphenoxy group, a 4-methoxyphenoxy group, a 2,6-dimethylphenoxy group, a 2,6-diisopropylphenoxy group, a 2,6-di-t-butylphenoxy group, and a 2,4,6-trimethylphenoxy group.

Among these, more preferred are a phenoxy group, a 4-methylphenoxy group, a 4-methoxyphenoxy group, and a 2,6-diisopropylphenoxy group, and particularly preferred are a phenoxy group, and a 4-methoxyphenoxy group.

Preferred examples of the hydrocarbon group having 1 to 20 carbon atoms in the silyl group substituted with a hydrogen atom or the hydrocarbon group having 1 to 20 carbon atoms represented by $R^8$, $R^9$, $R^{10}$ or $R^{11}$ are the same as the aforementioned preferred examples of the hydrocarbon group having 1 to 20 carbon atoms represented by $R^8$, $R^9$, $R^{10}$ or $R^{11}$.

More preferred examples of the silyl group substituted with a hydrogen atom or a hydrocarbon group having 1 to 20 carbon atoms represented by $R^8$, $R^9$, $R^{10}$ or $R^{11}$ include a trimethylsilyl group, a triethylsilyl group, a tri(n-propyl)silyl group, a triisopropylsilyl group, a t-butyldimethylsilyl group, and a triphenylsilyl group, and particularly preferred are a trimethylsilyl group, a triethylsilyl group, and a triisopropylsilyl group.

The hydrocarbon group having 1 to 20 carbon atoms substituted with a halogen atom represented by $R^8$, $R^9$, $R^{10}$ or $R^{11}$ is preferably a group in which the aforementioned hydrocarbon group having 1 to 20 carbon atoms is substituted with a fluorine atom, a chlorine atom, or a bromine atom. Specific preferred examples thereof include a trifluoromethyl group and a pentafluorophenyl group.

In one embodiment, all of $R^8$, $R^9$, $R^{10}$ and $R^{11}$ are a hydrogen atom.

The electron-donating ligand (L) is a compound having an electron-donating group and capable of coordinating with the metal atom M to stabilize the metal complex.

Examples of the electron-donating ligand (L) having a sulfur atom include dimethylsulfoxide (DMSO). Examples of the electron-donating ligand (L) having a nitrogen atom include a trialkylamine having alkyl groups having 1 to 10 carbon atoms, a dialkylamine having alkyl groups having 1 to 10 carbon atoms, pyridine, 2,6-dimethylpyridine (also known as 2,6-lutidine), aniline, 2,6-dimethylaniline, 2,6-diisopropylaniline, N,N,N',N'-tetramethylethylenediamine (TMEDA), 4-(N,N-dimethylamino)pyridine (DMAP), acetonitrile, benzonitrile, quinoline, and 2-methylquinoline. Examples of the electron-donating ligand (L) having an oxygen atom include diethyl ether, tetrahydrofuran, and 1,2-dimethoxyethane. Dimethylsulfoxide (DMSO), pyridine, 2,6-dimethylpyridine (also known as 2,6-lutidine), and N,N,N',N'-tetramethylethylenediamine (TMEDA) are preferable, and dimethylsulfoxide (DMSO), and 2,6-dimethylpyridine (also known as 2,6-lutidine) are more preferable, from the viewpoint of stabilization and catalytic activity of the metal complex.

q is 0, ½, 1 or 2. q of ½ means that one divalent electron-donating ligand is coordinated to two metal complexes. It is preferable that q be ½ or 1 in terms of stabilizing the metal complex catalyst. By q being 0, it is meant that there is no ligand.

The metal complex represented by formula (C1) can be synthesized by the method described in known literature (e.g., J. Am. Chem. Soc. 2007, 129, 8948). That is, a zero- or di-valent M source is reacted with a ligand in formula (C1) to synthesize the metal complex.

Examples of zero-valent M sources include tris(dibenzylideneacetone)dipalladium as a palladium source, and tetracarbonylnickel(0): $Ni(CO)_4$, and bis(1,5-cyclooctadiene)nickel as a nickel source.

Examples of divalent M sources include (1,5-cyclooctadiene)(methyl)palladium chloride, palladium chloride, palladium acetate, bis(acetonitrile)dichloropalladium: $PdCl_2(CH_3CN)_2$, bis(benzonitrile)dichloropalladium: $PdCl_2(PhCN)_2$, (N,N,N',N'-tetramethylethylenediamine)dichloropalladium(II): $PdCl_2(TMEDA)$, (N,N,N',N'-tetramethylethylenediamine)dimethylpalladium(II): $PdMe_2(TMEDA)$, bis(acetylacetonato)palladium(II): $Pd(acac)_2$ (acac=acetylacetonato), and palladium(II) trifluoromethanesulfonate: $Pd(OSO_2CF_3)_2$ as a palladium source, and (allyl)nickel chloride, (allyl)nickel bromide, nickel chloride, nickel acetate, bis(acetylacetonato)nickel(Ti): $Ni(acac)_2$, (1,2-dimethoxyethane)dichloronickel(II): $NiCl_2(DME)$, and nickel(II) trifluoromethanesulfonate: $Ni(OSO_2CF_3)_2$ as a nickel source.

The metal complex represented by formula (C1) can be isolated and used. A metal source containing M and a ligand precursor can be contacted in a reaction system and directly (in situ) subjected to polymerization without isolating the complex. In particular, when $R^5$ in formula (C1) is a hydrogen atom, it is preferable that a metal source containing a zero-valent M and a ligand precursor be reacted, and then subjected to polymerization without isolating the complex.

In this case, the ligand precursor in the case of formula (C1) is represented by

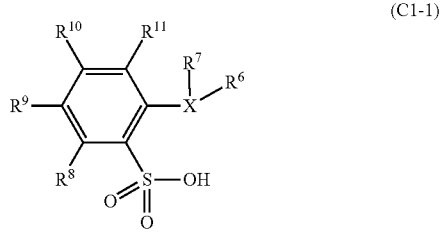

(C1-1)

wherein symbols in the formula have the same meanings as above.

The ratio of the M source (M) to the ligand precursor (C1-1) (C1 ligand) in formula (C1) ((C1 ligand)/M) is preferably selected from the range of 0.5 to 2.0, and more preferably the range of 1.0 to 1.5.

In the case of isolating the metal complex of formula (C1), a metal complex stabilized by coordination of an electron-donating ligand (L) beforehand may be used. In this case, q is ½, 1 or 2. As mentioned above, q of ½ means that one divalent electron-donating ligand is coordinated to two metal complexes. It is preferable that q be ½ or 1 in terms of stabilizing the metal complex catalyst. By q being 0, it is meant that there is no ligand.

The metal complex represented by formula (C1) can also be supported on a carrier and used for polymerization. The carrier in this case is not particularly limited, and examples thereof include an inorganic carrier, such as silica gel and alumina, and an organic carrier, such as polystyrene, polyethylene, and polypropylene. Examples of a method for supporting the metal complex include a physical adsorption method in which a solution of the metal complex is impregnated in a carrier and dried, and a method in which the metal complex is chemically coupled to the carrier and supported thereon.

[Monomer]

In the method for producing a polymer according to the present invention, not only ethylene can be homopolymerized, but also ethylene and an olefin having a polar group can be copolymerized. The olefin having a polar group, which is a second monomer, used in copolymerization according to the present invention is represented by formula (1)

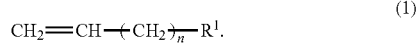

(1)

In the formula, $R^1$ represents a substituent selected from the group consisting of a hydroxy group, an alkoxy group having 1 to 10 carbon atoms, an aryloxy group having 6 to 20 carbon atoms, an acyl group having 2 to 10 carbon atoms, an ester group (oxycarbonyl group; R—O—(C=O)—, R is an organic group) having 2 to 10 carbon atoms, an acyloxy group having 2 to 10 carbon atoms, an amino group, a substituted amino group having 1 to 12 carbon atoms, a substituted amido group having 2 to 12 carbon atoms, a substituted pyridyl group having 5 to 10 carbon atoms, a substituted pyrrolidyl group having 4 to 10 carbon atoms, a substituted piperidyl group having 5 to 10 carbon atoms, a substituted hydrofuryl group having 4 to 10 carbon atoms, a substituted imidazolyl group having 4 to 10 carbon atoms, a mercapto group, an alkylthio group having 1 to 10 carbon atoms, an arylthio group having 6 to 10 carbon atoms, an epoxy group, and a halogen atom. n is 0, or an integer selected from 1 to 6.

$R^1$ being an alkoxy group having 1 to 10 carbon atoms is preferably an alkoxy group having 1 to 4 carbon atoms, and preferred examples thereof include a methoxy group, an ethoxy group, an isopropoxy group, a 1-propoxy group, a 1-butoxy group, and a t-butoxy group.

Among these, more preferred are a methoxy group, an ethoxy group, and an isopropoxy group, and particularly preferred is a methoxy group.

$R^1$ being an aryloxy group having 6 to 20 carbon atoms is preferably an aryloxy group having 6 to 12 carbon atoms, and preferred examples thereof include a phenoxy group, a 4-methylphenoxy group, a 4-methoxyphenoxy group, a 2,6-dimethylphenoxy group, a 3,5-di-t-butylphenoxy group, and a 2,6-di-t-butylphenoxy group.

Among these, more preferred are a phenoxy group, a 3,5-di-t-butylphenoxy group, and a 2,6-dimethylphenoxy group, and particularly preferred are a phenoxy group and a 3,5-di-t-butylphenoxy group.

$R^1$ being an acyl group having 2 to 10 carbon atoms is preferably an acyl group having 2 to 8 carbon atoms, and preferred examples thereof include an acetyl group, a propionyl group, a butyryl group, an isobutyryl group, a valeryl group, an isovaleryl group, a pivaloyl group, and a benzoyl group.

Among these, more preferred are an acetyl group, a pivaloyl group, and a benzoyl group, and particularly preferred is a benzoyl group.

In the ester group (oxycarbonyl group; R—O—(C=O)—, R is an organic group) having 2 to 10 carbon atoms, the organic group R is preferably an alkyl group optionally having a functional group, such as a hydroxy group and an epoxy group, or an aryl group optionally having the functional group. $R^1$ is preferably an ester group having 2 to 8 carbon atoms, and preferred examples thereof include a methoxycarbonyl group, an ethoxycarbonyl group, an n-propoxycarbonyl group, an isopropoxycarbonyl group, an n-butoxycarbonyl group, a t-butoxycarbonyl group, a (4-hydroxybutoxy)carbonyl group, a (4-glycidylbutoxy)carbonyl group, and a phenoxycarbonyl group.

Among these, more preferred are a methoxycarbonyl group, an ethoxycarbonyl group, and a (4-hydroxybutoxy) carbonyl group, and particularly preferred is a methoxycarbonyl group.

$R^1$ being an acyloxy group having 2 to 10 carbon atoms is preferably an acyloxy group having 2 to 8 carbon atoms, and preferred examples thereof include an acetyloxy group, a propionyloxy group, a butyryloxy group, an isobutyryloxy group, a valeryloxy group, an isovaleryloxy group, a pivaloyloxy group, and a benzoyloxy group.

Among these, more preferred are an acetyloxy group, a propionyloxy group, and a benzoyloxy group, and particularly preferred are an acetyloxy group and a propionyloxy group.

Preferred examples of $R^1$ being a substituted amino group having 1 to 12 carbon atoms include a monomethylamino group, a dimethylamino group, a monoethylamino group, a diethylamino group, a monoisopropylamino group, a diisopropylamino group, a monophenylamino group, a diphenylamino group, a bis(trimethylsilyl)amino group, and a morpholinyl group.

Among these, more preferred are a dimethylamino group and a diphenylamino group.

In the substituted amido group (R—(C=O)NH—, R is an organic group) having 1 to 12 carbon atoms, the organic group R is preferably an alkyl group optionally having a functional group, such as a hydroxy group and an epoxy group, or an aryl group optionally having the functional group. Preferred examples of $R^1$ include an acetamido group, a propionylamino group, a butyrylamino group, an isobutyrylamino group, a valerylamino group, an isovalerylamino group, a pivaloylamino group, and a benzoylamino group.

Among these, more preferred are an acetamido group, a propionylamino group, and a benzoylamino group, and particularly preferred is an acetamido group.

Preferred examples of $R^1$ being a substituted pyridyl group having 5 to 10 carbon atoms include a 2-pyridyl group, a 3-pyridyl group, a 2-(3-methyl)pyridyl group, a 2-(4-methyl)pyridyl group, a 3-(2-methyl)pyridyl group, a 3-(4-methyl)pyridyl group, a 2-(4-chloromethyl)pyridyl group, and a 3-(4-chloromethyl)pyridyl group.

Among these, more preferred are a 2-pyridyl group, a 3-pyridyl group, and a 2-(4-methyl)pyridyl group, and particularly preferred is a 2-pyridyl group.

Preferred examples of $R^1$ being a substituted pyrrolidyl group having 4 to 10 carbon atoms include a 2-pyrrolidyl group, a 3-pyrrolidyl group, a 2-(1-methyl)pyrrolidyl group, a 2-(1-butyl)pyrrolidyl group, a 2-(1-cyclopentenyl)pyrrolidyl group, a 2-(4-methoxycarbonyl)pyrrolidyl group, a 2-(5-methoxycarbonyl)pyrrolidyl group, and a 2-(6-methoxycarbonyl)pyrrolidyl group.

Among these, more preferred are a 2-pyrrolidyl group, a 3-pyrrolidyl group, a 2-(1-methyl)pyrrolidyl group, and a 2-(6-methoxycarbonyl)pyrrolidyl group, and particularly preferred is a 2-pyrrolidyl group.

Preferred examples of $R^1$ being a substituted piperidyl group having 5 to 10 carbon atoms include a 2-piperidyl group, a 3-piperidyl group, a 2-(1,2,3,6-tetrahydro)piperidyl group, a 2-(1-methyl)piperidyl group, a 2-(1-ethyl)piperidyl group, a 2-(4-methyl)piperidyl group, a 2-(5-methyl)piperidyl group, and a 2-(6-methyl)piperidyl group.

Among these, more preferred are a 2-piperidyl group, a 3-piperidyl group, a 2-(1,2,3,6-tetrahydro)piperidyl group, and a 2-(6-methyl)piperidyl group, and particularly preferred are a 2-piperidyl group and a 2-(1,2,3,6-tetrahydro)piperidyl group.

Preferred examples of $R^1$ being a substituted hydrofuryl group having 4 to 10 carbon atoms include a 2-tetrahydrofuryl group, a 3-tetrahydrofuryl group, a 2-(5-methyl)tetrahydrofuryl group, a 2-(5-isopropyl)tetrahydrofuryl group, a 2-(5-ethyl)tetrahydrofuryl group, a 2-(5-methoxy)tetrahydrofuryl group, a 2-(5-acetyl)tetrahydrofuryl group, and a 2-(4,5-benzo)tetrahydrofuryl group.

Among these, more preferred are a 2-tetrahydrofuryl group, a 3-tetrahydrofuryl group, a 2-(5-methyl)tetrahydrofuryl group, a 2-(5-isopropyl)tetrahydrofuryl group, and a 2-(4,5-benzo)tetrahydrofuryl group, and particularly preferred are a 2-tetrahydrofuryl group, a 2-(5-methyl)tetrahydrofuryl group, and a 2-(5-isopropyl)tetrahydrofuryl group.

Preferred examples of $R^1$ being a substituted imidazolyl group having 4 to 10 carbon atoms include a 2-imidazolyl group, a 2-(1-methyl)imidazolyl group, a 2-(1-benzyl)imidazolyl group, a 2-(1-acetyl)imidazolyl group, a 2-(4,5-benzo)imidazolyl group, and a 2-(1-methyl-4,5-benzo)imidazolyl group.

Among these, preferred are a 2-imidazolyl group, a 2-(1-methyl)imidazolyl group, and a 2-(4,5-benzo)imidazolyl group, and particularly preferred are a 2-(1-methyl)imidazolyl group and a 2-(4,5-benzo)imidazolyl group.

Preferred examples of $R^1$ being an alkylthio group having 1 to 10 carbon atoms include a methylthio group, an ethylthio group, a propylthio group, and a t-butylthio group, and preferred examples of $R^1$ being an arylthio group having 6 to 10 carbon atoms include a phenylthio group.

Among these, more preferred are a methylthio group, a t-butylthio group, and a phenylthio group, and particularly preferred are a methylthio group and a phenylthio group.

Preferred examples of $R^1$ being a halogen atom include a fluorine atom, a chlorine atom, and a bromine atom. Among these, more preferred is a chlorine atom.

Among the preferred groups of $R^1$, more preferred are an alkoxy group having 1 to 10 carbon atoms, an ester group having 2 to 10 carbon atoms, and an acyloxy group having 2 to 10 carbon atoms.

The value of n in formula (1) is preferably 0 or 1, and more preferably 1.

Specific examples of a particularly preferred polar comonomer represented by formula (1) include methyl acrylate, ethyl acrylate, allyl acetate, and allyl methyl ether.

In the method for producing a (co)polymer according to the present invention, the olefin having a polar group represented by formula (1) to be copolymerized with ethylene may be polymerized by combining two or more kinds thereof.

In the method for producing a (co)polymer according to the present invention, an additional monomer (a third monomer) may be used in addition to ethylene and the olefin having a polar group represented by formula (1). Examples of the third monomer include an α-olefin, such as propylene, 1-butene, 1-pentene, 1-hexene, 4-methyl-1-pentene, 1-heptene, 1-octene, 1-nonene, 1-decene, and styrene. Among these, preferred are propylene, 1-butene, and 1-hexene.

These may be polymerized by combining two or more kinds thereof. When an α-olefin is copolymerized as the third monomer, the ratio of the α-olefin to the total of α-olefin and ethylene contained in the obtained polymer is less than 40 mol %.

[Polymerization Method]

A method for polymerizing ethylene alone or ethylene and the monomer represented by formula (1) by using the metal complex according to the present invention as a catalyst is not particularly limited, and may be a commonly used polymerization method. That is, a process method, such as a solution polymerization method, a suspension polymerization method, and a gas phase polymerization method, may be used, and a solution polymerization method and a suspension polymerization method are particularly preferable. A polymerization mode may be either a batch mode or a continuous mode. The polymerization may be carried out in a single stage polymerization or in a multistage polymerization.

Two or more kinds of the metal complex catalyst represented by formula (C1) may be mixed and used for the polymerization reaction. By using the mixture, it is possible to control the molecular weight, the molecular weight distribution and the content of the monomer unit derived from the monomer of formula (1) of the polymer, thereby obtaining a polymer suitable for a desired use. The molar ratio of the total amount of monomer to the total amount of metal complex catalyst is in the range of 1 to 10,000,000, preferably in the range of 10 to 1,000,000, and more preferably in the range of 100 to 100,000, in terms of a monomer/metal complex ratio.

The polymerization temperature is not particularly limited, but the polymerization is usually carried out in the range of −30 to 400° C., preferably in the range of 0 to 200° C., more preferably in the range of 30 to 180° C.

The polymerization pressure, in which the ethylene pressure occupies the majority of the internal pressure, is in the range of atmospheric pressure to 100 MPa, preferably in the range of atmospheric pressure to 20 MPa, and more preferably in the range of atmospheric pressure to 10 MPa.

The polymerization time may be appropriately adjusted according to the process mode, the polymerization activity of the catalyst, etc., and a short reaction time of several tens of seconds to several minutes or a long reaction time of several thousands of hours is possible.

The atmosphere in the polymerization system is preferably filled with an inert gas, such as nitrogen gas or argon, so as not to mix air, oxygen, moisture, etc., other than the monomer, in order to prevent the activity of the catalyst from decreasing. In the case of solution polymerization, an inert solvent other than the monomer may be used. Examples of inert solvents include, but are not particularly limited to, aliphatic hydrocarbons, such as isobutane, pentane, hexane, heptane, and cyclohexane; aromatic hydrocarbons, such as benzene, toluene, and xylene; halogenated aliphatic hydrocarbons, such as chloroform, methylene chloride, carbon tetrachloride, dichloroethane, and tetrachloroethane; halogenated aromatic hydrocarbons, such as chlorobenzene, dichlorobenzene, and trichlorobenzene; aliphatic esters, such as methyl acetate and ethyl acetate; and aromatic esters, such as methyl benzoate and ethyl benzoate.

EXAMPLES

Hereinafter, the present invention will be described in more detail with reference to Examples and Comparative Examples, but the present invention is not limited to the following examples.

[Method for Analyzing the Structure of a Polymer]

The number-average molecular weight and the weight-average molecular weight of (co)polymers obtained in Examples were calculated by size-exclusion chromatography (solvent: 1,2-dichlorobenzene, temperature: 145° C.) using a high-temperature GPC apparatus HLC-8121GPC/HT manufactured by Tosoh Corporation equipped with AT-806MS columns (two columns in series) manufactured by Showa Denko K.K., and using polystyrene as a standard material of molecular weight.

The content of monomer units derived from olefins having a polar group represented by formula (1) was determined by $^1$H-NMR at 120° C. using 1,1,2,2-tetrachloroethane-d2 as a solvent, and using JNM-ECS400 manufactured by JEOL Ltd.

[Synthesis of Metal Complexes 1 to 3]

Metal complexes 1 and 2 were synthesized according to the following reaction scheme.

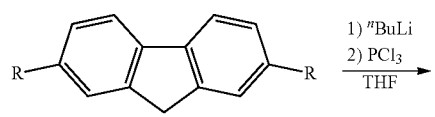

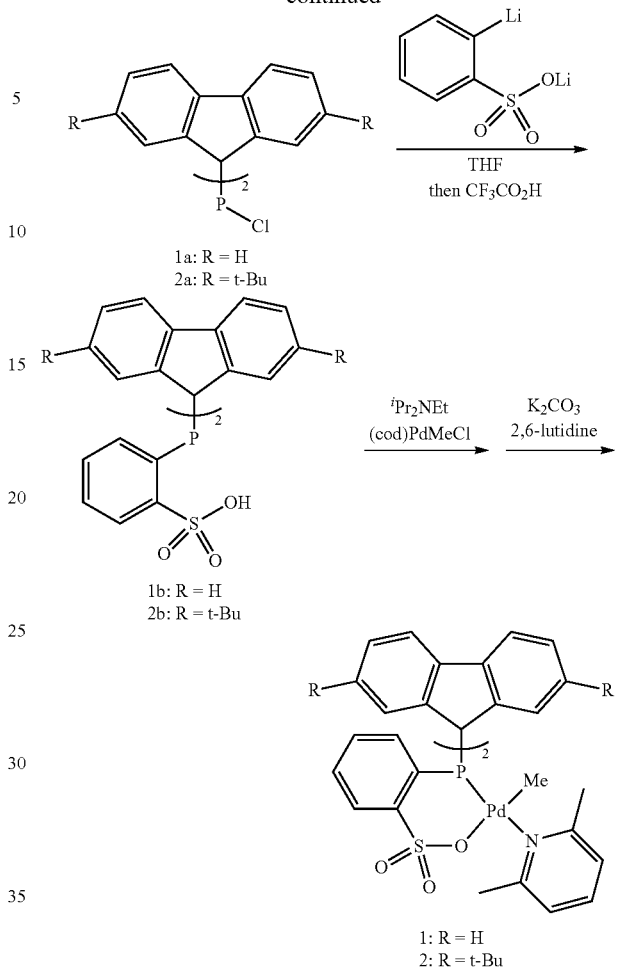

(a) Synthesis of chlorodi(9-fluorenyl)phosphine (Compound 1a)

To a 500 mL recovery flask, to which fluorene (12.1 g, 72.8 mmol), diethyl ether (150 mL) and hexane (150 mL) were added, n-butyllithium (1.6 M hexane solution, 45.5 mL, 72.8 mmol) was added dropwise while cooling in an ice bath, and thereafter stirred for 3 hours. After removing the ice bath and returning to room temperature, the mixture was cooled to −70° C. or lower in a dry ice/ethanol bath. A solution of phosphorus trichloride (5.0 g, 36.4 mmol) in diethyl ether (10 mL) was added dropwise and stirred at −70° C. or lower for 1 hour, and then the temperature was gradually raised to room temperature and stirred for 12 hours. A residue after distilling off the solvent under reduced pressure was subjected to dichloromethane extraction, and then the solvent was concentrated to obtain a white solid. Yield was 0.97 g (7% yield). $^{31}$P-NMR (162 MHz, CDCl$_3$): δ108.7.

(b) Synthesis of di(9-fluorenyl)phosphinobenzenesulfonic acid (Compound 1b)

To a 100 mL recovery flask, to which benzenesulfonic acid (0.126 g, 0.80 mmol) and tetrahydrofuran (15 mL) were added, n-butyllithium (1.6 M, 0.99 mL, 1.59 mmol) was added dropwise while cooling in an ice bath. After removing the ice bath and stirring at room temperature for 1 hour, a solution of compound 1a, i.e., chlorodi(9-fluorenyl)phosphine (0.30 g, 0.76 mmol), in tetrahydrofuran (10 mL) was added dropwise while cooling to −70° C. or lower in a dry ice/ethanol bath. Stirring was continued for 16 hours while the temperature was gradually raised to room temperature. After distilling off the solvent under reduced pressure to about ¼, trifluoroacetic acid (0.13 g, 1.14 mmol) was added. Further, dichloromethane and distilled water were added, followed by fractional liquid-liquid extraction with dichloromethane. The extracted organic layer was washed with a saturated aqueous sodium chloride solution and dried over magnesium sulfate, and then the solvent was distilled off by using a rotary evaporator. The resulting residue was reprecipitated with dichloromethane and hexane to obtain a white solid.

Yield was 0.21 g (54% yield).

$^1$H-NMR (400 MHz, CDCl$_3$): δ8.44 (dd, J=7.6, 7.8 Hz, 1H), 7.86 (t, J=6.2 Hz, 1H), 7.81 (d, J=8.0 Hz, 2H), 7.70 (d, J=7.6 Hz, 2H), 7.47 (d, J=6.2 Hz, 2H), 7.4-7.15 (m, 8H), 7.08-7.0 (m, 5H), 6.84 (dd, J=15.8, 7.4 Hz, 1H), 6.06 (d, J=24.4 Hz, 2H);

$^{31}$P-NMR (162 MHz, CDCl$_3$): δ42.5.

(c) Synthesis of Metal Complex 1

Under a stream of nitrogen gas, to a 100 mL recovery flask containing compound 1b (0.060 g, 0.12 mmol), N,N-diisopropylethylamine (0.15 g, 1.16 mmol) and methylene chloride (10 mL), (cod)PdMeCl (cod=1,5-cyclooctadiene, 0.031 g, 0.12 mmol) was added and stirred at room temperature for 1 hour. After concentrating the reaction solution under reduced pressure, dichloromethane (10 mL), potassium carbonate (0.16 g, 1.2 mmol) and 2,6-lutidine (0.12 g, 1.2 mmol) were added to the residue and stirred at room temperature for 2 hours. After filtration of the reaction solution with Celite (dried diatomaceous earth) and Florisil (magnesium silicate), the solvent was concentrated and subjected to drying under reduced pressure. The obtained residue was separated and purified by silica gel column chromatography using a mixed solution of diethyl ether/methylene chloride as an eluent while changing the solvent ratio, and then reprecipitation was carried out using methylene chloride and hexane to obtain metal complex 1.

Yield was 0.027 g (31% yield).

$^1$H-NMR (400 MHz, CDCl$_3$): δ8.56 (br, 2H), 8.00 (dd, J=7.2, 4.0 Hz, 1H), 7.85 (d, J=8.0 Hz, 2H), 7.78 (br, 2H), 7.6-7.35 (m, 8H), 7.32 (t, J=7.2 Hz, 1H), 6.95 (d, J=7.2 Hz, 2H), 6.87 (t, J=7.4 Hz, 1H), 6.78 (t, J=8.0 Hz, 1H), 5.52 (d, J=12.0 Hz, 2H), 2.7 (br, 6H), −0.16 (d, J=2.8 Hz, 3H);

$^{31}$P-NMR (162 MHz, CDCl$_3$): δ22.8.

(d) Synthesis of chlorodi(2,7-di-t-butylfluoren-9-yl)phosphine (Compound 2a)

To a 500 mL recovery flask containing 2,7-di-t-butylfluorene (10.5 g, 37.6 mmol), diethyl ether (110 mL) and hexane (110 mL), n-butyllithium (1.6 M, 23.5 mL, 37.6 mmol) was added dropwise while cooling in an ice bath, and stirred for 3 hours. After removing the ice bath and returning to room temperature, a solution of phosphorus trichloride (2.58 g, 18.8 mmol) in dehydrated diethyl ether (10 mL) was added dropwise while cooling to −70° C. or lower in a dry ice/ethanol bath. After stirring for 1 hour at −70° C. or lower, the mixture was stirred for 12 hours while the temperature was gradually raised to room temperature. After distilling off the solvent under reduced pressure to about ¼, Celite filtration was carried out, and the mixture was dried by distilling off the solvent under reduced pressure. The obtained solid was washed with hexane and dried under reduced pressure to obtain a white solid. Yield was 0.84 g (7% yield).

$^1$H-NMR (400 MHz, CDCl$_3$): δ7.94 (s, 2H), 7.8-7.7 (m, 6H), 7.50 (t, J=7.6 Hz, 4H), 4.96 (d, J=12.4 Hz, 2H), 1.33 (d, J=14.4 Hz, 38H);

$^{31}$P-NMR (162 MHz, CDCl$_3$): δ107.2.

(e) Synthesis of di(2,7-di-t-butylfluoren-9-yl)phosphinobenzenesulfonic acid (compound 2b)

To a 100 mL recovery flask containing benzenesulfonic acid (0.225 g, 1.42 mmol) and tetrahydrofuran (40 mL), n-butyllithium (1.6 M, 1.77 mL, 2.84 mmol) was added dropwise while cooling in an ice bath. After removing the ice bath and stirring at room temperature for 1 hour, a solution of compound 2a, i.e., chlorodi(2,7-di-t-butylfluoren-9-yl)phosphine (0.84 g, 1.35 mmol), in tetrahydrofuran (10 mL) was added dropwise while cooling to −70° C. or lower in a dry ice/ethanol bath. The mixture was stirred for 18 hours while the temperature was gradually raised to room temperature. After distilling off the solvent under reduced pressure to about ¼, trifluoroacetic acid (0.30 g, 2.63 mmol) was added. Dichloromethane and distilled water were added to the reaction solution, followed by fractional liquid-liquid extraction with dichloromethane. The extracted organic layer was washed with a saturated aqueous sodium chloride solution and dried over magnesium sulfate, and then the solvent was distilled off by using a rotary evaporator. The resulting residue was reprecipitated with dichloromethane and hexane to obtain a white solid. Yield was 0.75 g (75% yield).

$^1$H-NMR (400 MHz, CDCl$_3$): δ8.77 (s, 1H), 8.44 (dd, J=7.6, 4.4 Hz, 1H), 7.9-7.8 (m, 3H), 7.71 (d, J=6.8 Hz, 1H), 7.63 (d, J=6.4 Hz, 1H), 7.5 (m, 2H), 7.4 (m, 2H), 6.90 (dd, J=15.8, 7.6 Hz, 1H), 6.73 (s, 1H), 6.36 (d, J=24.8 Hz, 1H), 5.78 (d, 1H), 5.74 (s, 1H), 4.99 (d, 1H), 1.58 (s, 18H), 1.09 (s, 18H);

$^{31}$P-NMR (162 MHz, CDCl$_3$): δ43.3.

(f) Synthesis of Metal Complex 2

Under a stream of nitrogen gas, to a 100 mL recovery flask containing compound 2b (0.38 g, 0.51 mmol), N,N-diisopropylethylamine (0.65 g, 5.1 mmol) and methylene chloride (10 mL), (cod)PdMeCl (cod=1,5-cyclooctadiene, 0.13 g, 0.51 mmol) was added and stirred at room temperature for 1 hour. After concentrating the solution under reduced pressure, dichloromethane (10 mL), potassium carbonate (0.70 g, 5.1 mmol) and 2,6-lutidine (0.54 g, 5.1 mmol) were added to the residue and stirred at room temperature for 1 hour. After filtration of the reaction solution with Celite (dried diatomaceous earth) and Florisil (magnesium silicate), the solvent was concentrated and subjected to drying under reduced pressure. The obtained residue was separated and purified by silica gel column chromatography using a mixed solvent of diethyl ether/methylene chloride as an eluent while changing the solvent ratio. After concentrating the solvent to dry, the mixture was washed with hexane to obtain metal complex 2. Yield was 0.15 g (31% yield).

$^1$H-NMR (400 MHz, CDCl$_3$): δ8.49 (s, 1H), 8.38 (d, J=10.0 Hz, 2H), 8.03 (dd, J=7.6, 4.4 Hz, 1H), 7.88 (d, J=7.6 Hz, 1H), 7.78 (d, J=7.6 Hz, 1H), 7.72 (d, J=8.4 Hz, 1H), 7.64

(d, J=8.0 Hz, 1H), 7.59 (d, J=7.6 Hz, 1H), 7.50 (d, J=8.0 Hz, 1H), 7.42 (t, J=7.8 Hz, 1H), 7.4-7.3 (m, 3H), 6.98 (d, J=7.6 Hz, 1H), 6.90 (t, J=7.6 Hz, 1H), 6.85 (d, J=8.0 Hz, 1H), 6.59 (t, J=8.0 Hz, 1H), 5.99 (s, 1H), 5.49-5.42 (m, 2H), 3.25 (s, 3H), 2.12 (s, 3H), 0.0 (d, J=2.4 Hz, 3H);

$^{31}$P-NMR (162 MHz, CDCl$_3$): δ17.5.

(g) Synthesis of Metal Complex 3

In the same manner as in the method for synthesizing metal complex 2 described above, except that 2,6-lutidine in the raw materials for synthesizing metal complex 2 was changed to dimethyl sulfoxide, metal complex 3 was synthesized to obtain a target compound.

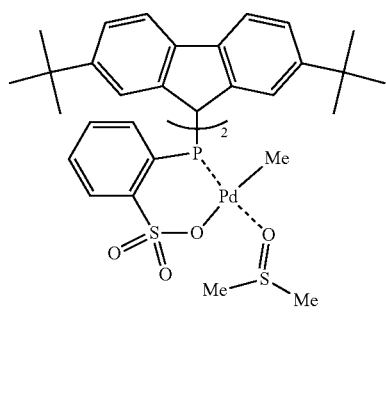

3

$^{1}$H-NMR (400 MHz, CDCl$_3$): δ8.50 (br, 1H), 8.35 (br, 2H), 8.00 (m, 1H), 7.92 (d, J=8.4 Hz, 1H), 7.80 (d, J=8.0 Hz, 1H), 7.68 (d, J=4.4 Hz, 1H), 7.63 (d, J=7.6 Hz, 2H), 7.43 (dd, J=16.0, 8.2 Hz, 2H), 7.34 (d, J=8.0 Hz, 2H), 6.92 (d, J=5.6 Hz, 2H), 6.03 (s, 1H), 5.36 (d, J=8.4 Hz, 1H), 5.28 (d, J=115.6 Hz, 1H), 2.73 (br, 6H), 1.48 (s, 9H), 1.38 (s, 18H), 0.96 (s, 9H), 0.04 (br, 3H).

Synthesis of Comparative Metal Complexes 1 to 3

(h) Synthesis of Comparative Metal Complex 1

According to the method described in JP 2014-159540 A, comparative metal complex 1 represented by the following formula Comparative metal complex 1

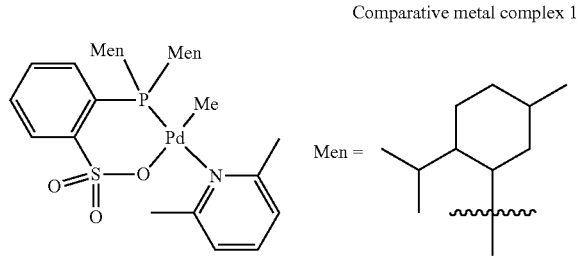

was synthesized.

(i) Synthesis of Comparative Metal Complex 2

According to the method described in JP 2011-68881 A, comparative metal complex 2 represented by the following formula Comparative metal complex 2

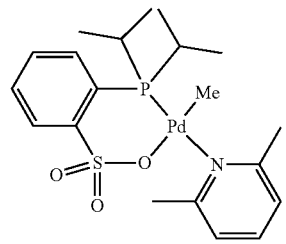

was synthesized.

(j) Synthesis of Comparative Metal Complex 3

According to the method described in WO 2016/067776, comparative metal complex 3 represented by the following formula Comparative metal complex 3

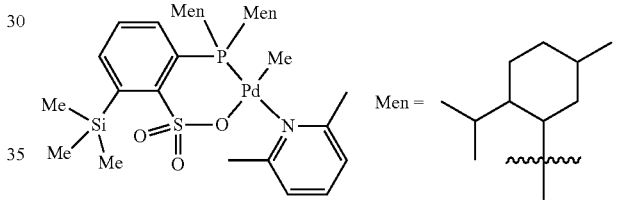

was synthesized.

Synthesis of Polymers (Co)polymerization of olefins was carried out using metal complexes 1 to 3 and comparative metal complexes 1 to 3 synthesized by the above methods. The polymerization conditions and the polymerization results are shown in Tables 1 and 2, respectively.

The catalyst concentration, productivity, and catalytic activity were calculated by the following formulae.

Catalyst concentration (mmol/L) =

$$\frac{\text{Molar number of metal complex catalyst used (mmol)} \times 1000}{\text{Volume of solvent (mL)} + \text{Volume of monomer having polar group (mL)}}$$

Productivity (g/mmol) = $\frac{\text{Yield of obtained polymer (g)}}{\text{Molar number of metal complex catalyst used (mmol)}}$ Catalytic activity (g/mmol·h) =

$$\frac{\text{Yield of obtained polymer (g)}}{\text{Molar number of metal complex catalyst used (mmol)} \times \text{reaction time (h)}}$$

Example 1: Homopolymerization of Ethylene Using Metal Complex 1 (Preparation of Polymer 1)

Toluene (50 mL) was added to a 120 mL autoclave containing metal complex 1 (0.071 mg, 0.00010 mmol) under a nitrogen gas atmosphere. After charging with ethylene (3.0 MPa), the autoclave was stirred at 80° C. for 1 hour. After cooling to room temperature, the reaction solution in the autoclave was added to methanol (300 mL) to precipitate a polymer. The resulting polymer was collected by filtration, washed with methanol, and dried under reduced pressure to obtain polymer 1. Yield was 2.60 g. The productivity was calculated to be 25,950 g/mmol and the catalytic activity was calculated to be 25,950 g/(mmol-h). The molecular weight of polymer 1 was measured by size-exclusion chromatography, and the number-average molecular weight was 118,000, the weight-average molecular weight was 234,000, and Mw/Mn was 2.0.

Example 2: Homopolymerization of Ethylene Using Metal Complex 2 (Preparation of Polymer 2)

Homopolymerization of ethylene was carried out in the same manner as in the method described in Example 1, except that the metal complex used was replaced with metal complex 2. The polymerization conditions and the polymerization results are shown in Table 1 and Table 2, respectively.

Comparative Examples 1 to 3: Homopolymerization of ethylene using comparative metal complexes 1 to 3 (preparation of comparative polymers 1 to 3)

Homopolymerization of ethylene was carried out in the same manner as in the method described in Example 1, except that the metal complex used was replaced with comparative metal complex 1, 2 or 3 and the number of moles of comparative metal complex 1, 2 or 3 used and the amount of solvent were changed. The polymerization conditions and the polymerization results are shown in Table 1 and Table 2, respectively.

Example 3: Copolymerization of Allyl Acetate and Ethylene Using Metal Complex 1 (Preparation of Polymer 3)

Allyl acetate (11.6 mL, 108 mmol) as a monomer represented by formula (1) and toluene (63.4 mL) were added to a 120 mL autoclave containing metal complex 1 (3.7 mg, 0.0050 mmol) under a nitrogen gas atmosphere. After charging with ethylene (4.0 MPa), the autoclave was stirred at 80° C. for 1 hour. After cooling to room temperature, the reaction solution in the autoclave was added to methanol (300 mL) to precipitate a copolymer. The resulting copolymer was collected by filtration, washed with methanol, and dried under reduced pressure to obtain polymer 3. Yield was 4.38 g. The productivity was calculated to be 875 g/mmol and the catalytic activity was calculated to be 875 g/(mmol-h). The molecular weight of polymer 3 was measured by size-exclusion chromatography, and the number-average molecular weight was 103,000, the weight-average molecular weight was 215,000, and Mw/Mn was 2.1. The allyl acetate content in the copolymer was determined to be 100:0.72 (allyl acetate molar fraction=0.73%) for ethylene: allyl acetate by $^1$H-NMR measurement.

Examples 4 and 5: Copolymerization of Allyl Acetate and Ethylene Using Metal Complexes 2 and 3 (Preparation of Polymers 4 and 5)

Copolymerization of allyl acetate and ethylene was carried out in the same manner as in the method described in Example 3, except that the metal complex used was replaced with metal complex 2 or 3 and the molar amount of the metal complex used was changed. The polymerization conditions and the polymerization results are shown in Table 1 and Table 2, respectively.

Comparative Examples 4 to 6: Copolymerization of Allyl Acetate and Ethylene Using Comparative Metal Complexes 1 to 3 (Preparation of Comparative Polymers 4 to 6)

Copolymerization of allyl acetate and ethylene was carried out in the same manner as in the method described in Example 3, except that the metal complex used was replaced with comparative metal complex 1, 2 or 3 and the number of moles of the comparative metal complex used was changed. The polymerization conditions and the polymerization results are shown in Table 1 and Table 2, respectively.

TABLE 1

| Examples | Catalyst Type | mg | mmol | Ethylene MPa | Formula (1) allyl acetate mL | Solvent Type | mL | Catalyst conc. mmol/L | Reaction temp. °C. | Reaction time h |
|---|---|---|---|---|---|---|---|---|---|---|
| Ex. 1 | Metal Complex 1 | 0.071 | 0.00010 | 3.0 | 0 | Toluene | 50 | 0.002 | 80 | 1 |
| Ex. 2 | Metal Complex 2 | 0.094 | 0.00010 | 3.0 | 0 | Toluene | 50 | 0.002 | 80 | 1 |
| Comp. Ex. 1 | Comp. Metal Complex 1 | 3.5 | 0.0050 | 3.0 | 0 | Toluene | 75 | 0.067 | 80 | 1 |
| Comp. Ex. 2 | Comp. Metal Complex 2 | 1.0 | 0.0020 | 3.0 | 0 | Toluene | 50 | 0.040 | 80 | 1 |
| Comp. Ex. 3 | Comp. Metal Complex 3 | 3.8 | 0.0050 | 3.0 | 0 | Toluene | 75 | 0.067 | 80 | 1 |
| Ex. 3 | Metal Complex 1 | 3.7 | 0.0050 | 4.0 | 11.6 | Toluene | 63.4 | 0.067 | 80 | 1 |
| Ex. 4 | Metal Complex 2 | 1.2 | 0.0013 | 4.0 | 11.6 | Toluene | 63.4 | 0.017 | 80 | 1 |
| Ex. 5 | Metal Complex 3 | 1.1 | 0.0013 | 4.0 | 11.6 | Toluene | 63.4 | 0.017 | 80 | 1 |

TABLE 1-continued

| Examples | Catalyst Type | mg | mmol | Ethylene MPa | Formula (1) allyl acetate mL | Solvent Type | mL | Catalyst conc. mmol/L | Reaction temp. °C. | Reaction time h |
|---|---|---|---|---|---|---|---|---|---|---|
| Comp. Ex. 4 | Comp. Metal Complex 1 | 3.5 | 0.0050 | 4.0 | 11.6 | Toluene | 63.4 | 0.067 | 80 | 1 |
| Comp. Ex. 5 | Comp. Metal Complex 2 | 2.5 | 0.0050 | 4.0 | 11.6 | Toluene | 63.4 | 0.067 | 80 | 1 |
| Comp. Ex. 6 | Comp. Metal Complex 3 | 3.8 | 0.0050 | 4.0 | 11.0 | Toluene | 63.4 | 0.067 | 80 | 1 |

TABLE 2

| Examples | Polymer No. | Yield g | Productivity g/mmol | Catalytic activity g/mmol · h) | Molecular weight Mn | Mw | Mw/Mn | Allyl acetate unit content mol % |
|---|---|---|---|---|---|---|---|---|
| Ex. 1 | 1 | 2.60 | 25,950 | 25,950 | 118,000 | 234,000 | 2.0 | 0 |
| Ex. 2 | 2 | 2.21 | 22,134 | 22,134 | 237,000 | 520,000 | 2.2 | 0 |
| Comp. Ex. 1 | Comp. 1 | 2.40 | 480 | 480 | 350,000 | 750,000 | 2.1 | 0 |
| Comp. Ex. 2 | Comp. 2 | 9.67 | 4,835 | 4,835 | 24,000 | 48,000 | 2.0 | 0 |
| Comp. Ex. 3 | Comp. 3 | 3.80 | 760 | 760 | 852,000 | 1,636,000 | 1.9 | 0 |
| Ex. 3 | 3 | 4.38 | 875 | 875 | 103,000 | 215,000 | 2.1 | 0.73 |
| Ex. 4 | 4 | 5.31 | 4,248 | 4,248 | 248,000 | 570,000 | 2.3 | 0.49 |
| Ex. 5 | 5 | 4.87 | 3,896 | 3,896 | 263,000 | 572,000 | 2.2 | 0.52 |
| Comp. Ex. 4 | Comp. 4 | 0.67 | 134 | 134 | 548,000 | 1,260,000 | 2.3 | 0.34 |
| Comp. Ex. 5 | Comp. 5 | 1.02 | 204 | 204 | 22,000 | 44,000 | 2.0 | 0.67 |
| Comp. Ex. 6 | Comp. 6 | 2.04 | 410 | 410 | 623,000 | 1,370,000 | 2.2 | 0.42 |

In the homopolymerization of ethylene, when metal complexes 1 and 2 according to the present invention were used (Examples 1 and 2), the productivity and the catalytic activity were greatly improved, as compared with those when comparative metal complexes 1 to 3 were used (Comparative Examples 1 to 3).

Further, it was found that, in the copolymerization of allyl acetate and ethylene, when metal complexes 1 to 3 according to the present invention were used (Examples 3 to 5), the productivity and the catalytic activity were higher than those when comparative metal complexes 1 to 3 were used (Comparative Examples 4 to 6).

From the above Examples and Comparative Examples, it was found that in the polymerization of an olefin containing an allyl monomer having a polar group, the metal complex catalyst according to the present invention has a higher catalytic activity than a conventional metal complex catalyst. In other words, by using the metal complex catalyst according to the present invention, it is possible to reduce the production cost of an olefin polymer of an allyl monomer having a polar group.

The invention claimed is:

1. A catalyst for olefin polymerization comprising a metal complex represented by formula (C1)

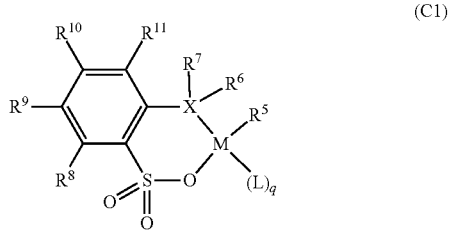

wherein, in the formula, M represents an element of Group 10 of the Periodic Table; X represents a phosphorus atom (P) or an arsenic atom (As); $R^5$ represents a substituent selected from the group consisting of a hydrogen atom, the group consisting of a halogen atom, a hydrocarbon group having 1 to 30 carbon atoms, a hydrocarbon group having 1 to 30 carbon atoms substituted with a halogen atom, a hydrocarbon group having 2 to 30 carbon atoms substituted with an alkoxy group having 1 to 10 carbon atoms, a hydrocarbon group having 7 to 30 carbon atoms substituted with an aryloxy group having 6 to 20 carbon atoms, a hydrocarbon group having 3 to 30 carbon atoms substituted with an amido group having 2 to 10 carbon atoms, an alkoxy group having 1 to 30 carbon atoms, an aryloxy group having 6 to 30 carbon atoms, and an acyloxy group having 2 to 10 carbon atoms; $R^6$ and $R^7$ each independently represent an alkoxy group, an aryloxy group, a silyl group, an amino group, or a hydrocarbon group having 1 to 180 carbon atoms which may be substituted with one or more groups selected from a halogen atom, an alkoxy group, and an aryloxy group, and at least one of $R^6$ and $R^7$ represents a 9-fluorenyl analogous group represented by formula (2)

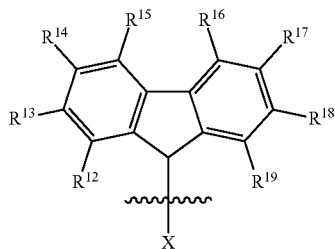

(2)

wherein, in the formula, $R^{12}$, $R^{13}$, $R^{14}$, $R^{15}$, $R^{16}$, $R^{17}$, $R^{18}$ and $R^{19}$ each independently represent a substituent selected from the group consisting of a hydrogen atom, a halogen atom, a hydrocarbon group having 1 to 10 carbon atoms, a hydrocarbon group having 1 to 10 carbon atoms substituted with a halogen atom, a hydrocarbon group having 2 to 20 carbon atoms substituted with an alkoxy group having 1 to 10 carbon atoms, a hydrocarbon group having 7 to 20 carbon atoms substituted with an aryloxy group having 6 to 10 carbon atoms, an alkoxy group having 1 to 10 carbon atoms, an aryloxy group having 6 to 10 carbon atoms, and an acyloxy group having 2 to 10 carbon atoms; and $R^{12}$, $R^{13}$, $R^{14}$, $R^{15}$, $R^{16}$, $R^{17}$, $R^{18}$ and $R^{19}$ may be bonded to each other to form a ring structure; wherein, in formula (2), a bond between a carbon atom and X in formula (C1) is depicted; $R^8$, $R^9$, $R^{10}$ and $R^{11}$ each independently represent a hydrogen atom, a halogen atom, a hydrocarbon group having 1 to 20 carbon atoms, an alkoxy group having 1 to 8 carbon atoms, an aryloxy group having 6 to 20 carbon atoms, a silyl group substituted with a hydrogen atom or a hydrocarbon group having 1 to 20 carbon atoms, or a hydrocarbon group having 1 to 20 carbon atoms substituted with a halogen atom; L represents an electron-donating ligand; and q is 0, ½, 1 or 2.

2. The catalyst for olefin polymerization according to claim 1, wherein the 9-fluorenyl analogous group represented by formula (2) is a 9-fluorenyl group or a 2,7-di-t-butyl-9-fluorenyl group.

3. The catalyst for olefin polymerization according to claim 1, wherein all of $R^8$, $R^9$, $R^{10}$ and $R^{11}$ in formula (C1) are a hydrogen atom.

4. A method for producing polyethylene; or a copolymer of ethylene and an olefin having a polar group represented by formula (1)

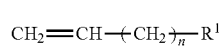

(1)

$$CH_2=CH-(CH_2)_n-R^1$$

wherein, in the formula, $R^1$ represents a substituent selected from the group consisting of a hydroxy group, an alkoxy group having 1 to 10 carbon atoms, an aryloxy group having 6 to 20 carbon atoms, an acyl group having 2 to 10 carbon atoms, an ester group (oxycarbonyl group; R—O—(C=O)—, R is an organic group) having 2 to 10 carbon atoms, an acyloxy group having 2 to 10 carbon atoms, an amino group, a substituted amino group having 1 to 12 carbon atoms, a substituted amido group having 2 to 12 carbon atoms, a substituted pyridyl group having 5 to 10 carbon atoms, a substituted pyrrolidyl group having 4 to 10 carbon atoms, a substituted piperidyl group having 5 to 10 carbon atoms, a substituted hydrofuryl group having 4 to 10 carbon atoms, a substituted imidazolyl group having 4 to 10 carbon atoms, a mercapto group, an alkylthio group having 1 to 10 carbon atoms, an arylthio group having 6 to 10 carbon atoms, an epoxy group, and a halogen atom; and n is 0, or an integer selected from 1 to 6; or a copolymer of ethylene, the olefin having a polar group represented by formula (1) and an additional monomer, the method comprising, by using a metal catalyst represented by formula (C1)

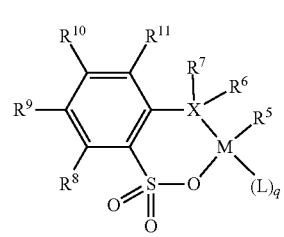

(C1)

wherein symbols in the formula have the same meanings as described in claim 1, as a polymerization catalyst, polymerizing ethylene alone; or copolymerizing ethylene and the olefin having a polar group represented by formula (1); or copolymerizing ethylene, the olefin having a polar group represented by formula (1) and the additional monomer.

5. The method for producing a polymer according to claim 4, wherein n in formula (1) is 0.

6. The method for producing a polymer according to claim 4, wherein n in formula (1) is 1.

7. The method for producing a polymer according to claim 4, wherein the 9-fluorenyl analogous group represented by formula (2) is a 9-fluorenyl group or a 2,7-di-t-butyl-9-fluorenyl group.

8. The method for producing a polymer according to claim 4, wherein all of $R^8$, $R^9$, $R^{10}$ and $R^{11}$ in formula (C1) are a hydrogen atom.

* * * * *